(12) United States Patent
Suzuki et al.

(10) Patent No.: US 11,643,041 B2
(45) Date of Patent: May 9, 2023

(54) OCCUPANT PROTECTION DEVICE

(71) Applicant: TOYODA GOSEI CO., LTD., Kiyosu (JP)

(72) Inventors: Yuya Suzuki, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/537,695

(22) Filed: Nov. 30, 2021

(65) Prior Publication Data

US 2022/0169195 A1 Jun. 2, 2022

(30) Foreign Application Priority Data

Nov. 30, 2020 (JP) .............................. JP2020-198868

(51) Int. Cl.
*B60R 21/205* (2011.01)
*B60R 21/231* (2011.01)
(Continued)

(52) U.S. Cl.
CPC .......... *B60R 21/205* (2013.01); *B60R 21/015* (2013.01); *B60R 21/231* (2013.01);
(Continued)

(58) Field of Classification Search
CPC . B60R 21/205; B60R 21/231; B60R 21/2338; B60R 21/239; B60R 21/015;
(Continued)

(56) References Cited

U.S. PATENT DOCUMENTS

| 3,784,225 A | * | 1/1974 | Fleck | B60R 21/231 |
| | | | | 280/729 |
| 3,792,873 A | * | 2/1974 | Buchner | B60R 21/23 |
| | | | | 139/389 |
| 3,929,350 A | * | 12/1975 | Pech | B60R 21/231 |
| | | | | 280/729 |
| 5,427,410 A | * | 6/1995 | Shiota | B60R 21/231 |
| | | | | 280/743.1 |

(Continued)

FOREIGN PATENT DOCUMENTS

| GB | 1455482 A | * 11/1976 | ........... B60R 21/231 |
| JP | 2012-171408 A | 9/2012 | |

(Continued)

*Primary Examiner* — Keith J Frisby
(74) *Attorney, Agent, or Firm* — Posz Law Group, PLC

(57) ABSTRACT

An occupant protection device includes: an airbag including an upper inflating portion and a lower inflating portion, and a rear inflating portion having a restraint surface that receives the occupant, the airbag being provided with a hollow portion penetrating in a left-right direction in a center; and a protrusion length adjustment unit configured to adjust a protrusion length from an accommodation position to the restraint surface in the airbag. An exhaust port configured to exhaust the inflation gas is disposed on an inner peripheral surface side in the vicinity of an intersection portion between the upper inflation portion and the lower inflation portion of the airbag. When the protrusion length by the protrusion length adjustment unit is adjusted to be long, the upper inflation portion and the lower inflation portion approach each other, so that an edge member approaches the exhaust port, thereby reducing an exhaust amount.

8 Claims, 17 Drawing Sheets

(51) Int. Cl.
   *B60R 21/2338*   (2011.01)
   *B60R 21/239*    (2006.01)
   *B60R 21/015*    (2006.01)
   *B60R 21/01*     (2006.01)

(52) U.S. Cl.
   CPC ............... *B60R 2021/01238* (2013.01); *B60R 2021/2395* (2013.01); *B60R 2021/23384* (2013.01); *B60R 2021/23388* (2013.01)

(58) Field of Classification Search
   CPC . B60R 2021/23115; B60R 2021/23388; B60R 2021/23382; B60R 2021/23386; B60R 2021/2395; B60R 2021/23384; B60R 2021/01238
   USPC .................. 280/732, 743.1, 743.2, 728.1
   See application file for complete search history.

(56) References Cited

U.S. PATENT DOCUMENTS

| | | | | |
|---|---|---|---|---|
| 8,240,705 | B2 * | 8/2012 | Ishida | B60R 21/231 |
| | | | | 280/743.1 |
| 9,308,883 | B1 * | 4/2016 | Schneider | B60R 21/231 |
| 11,046,282 | B2 * | 6/2021 | Lee | B60R 21/2338 |
| 11,066,032 | B2 * | 7/2021 | Jaradi | B60R 21/205 |
| 2017/0361800 | A1 * | 12/2017 | Ohachi | B60R 21/207 |
| 2019/0375364 | A1 | 12/2019 | Tanaka et al. | |
| 2020/0122678 | A1 * | 4/2020 | Tanaka | B60R 21/0132 |
| 2021/0387591 | A1 * | 12/2021 | Choi | B60R 21/2338 |

FOREIGN PATENT DOCUMENTS

| | | | | |
|---|---|---|---|---|
| JP | 2013119330 A | * | 6/2013 | ........... B60R 21/231 |
| JP | 2019-214352 A | | 12/2019 | |
| JP | 2020164143 A | * | 10/2020 | ......... B60R 21/0132 |
| WO | WO-2007045952 A1 | * | 4/2007 | ........... B60R 21/231 |

* cited by examiner

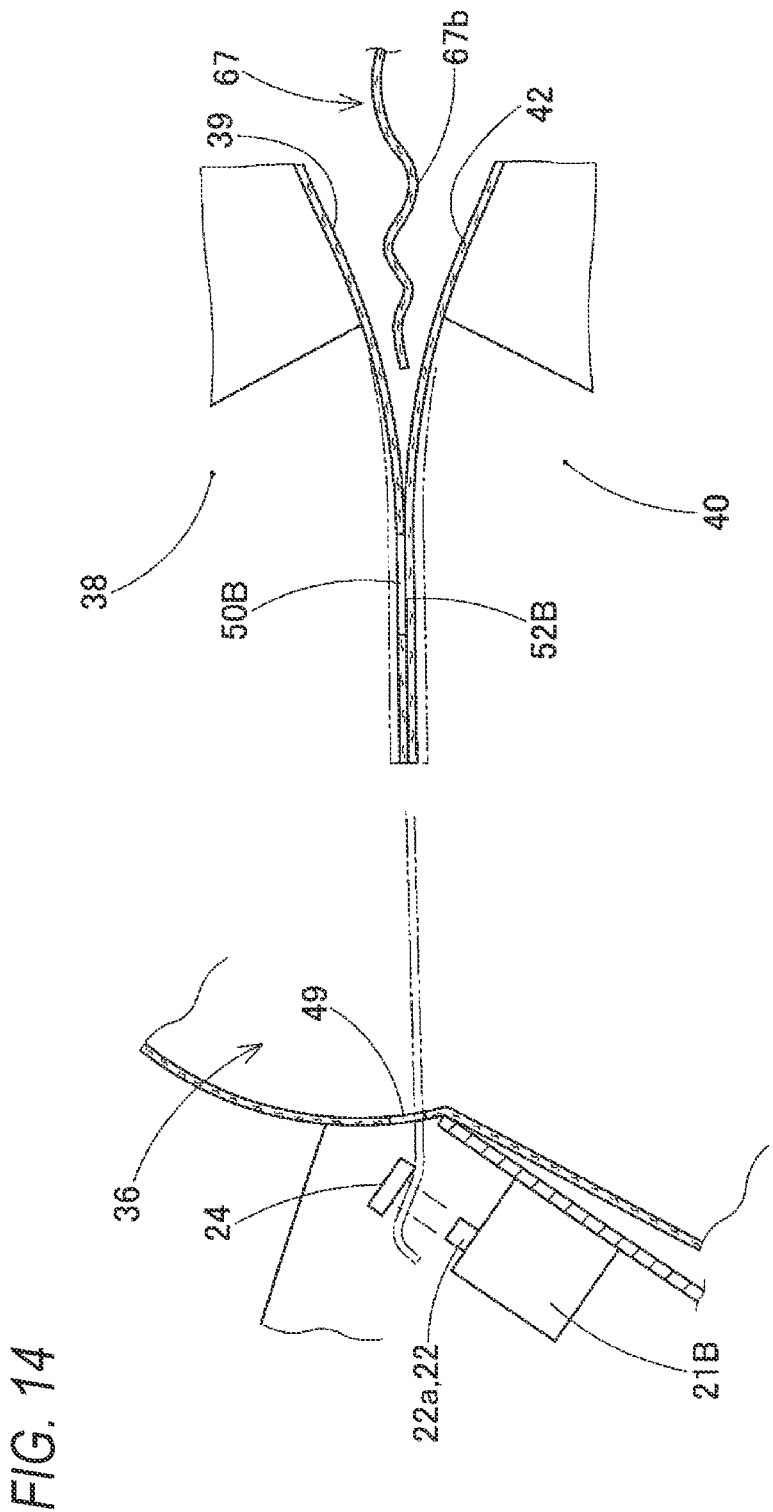

OCCUPANT PROTECTION DEVICE

CROSS-REFERENCE TO RELATED APPLICATION(S)

This application is based upon and claims the benefit of priority from prior Japanese patent application No. 2020-198868 filed on Nov. 30, 2020, the entire contents of which are incorporated herein by reference.

BACKGROUND

1. Field of the Invention

The present invention relates to an occupant protection device including an airbag that is folded and accommodated forward of a seated occupant in a vehicle, and that is deployed and inflated rearward from an accommodation position so as to receive the occupant when an inflation gas flows in. The occupant protection device is capable of adjusting a rearward protrusion length in the airbag from an accommodation position when the inflation is completed.

2. Description of the Related Art

In related art, an occupant protection device is known in which an airbag, when inflation is completed, adjusts a protrusion length from an accommodation position while preventing an increase in volume, so as to receive and protect a seated occupant (for example, refer to JP-A-2019-214352). The airbag includes, as inflating portions: an upper inflating portion and a lower inflating portion that extend rearward in a manner branched upward and downward from the accommodating position, and a rear inflating portion coupling rear ends of the upper inflating portion and the lower inflating portion, the rear inflating portion having a rear surface side serving as a restraint surface that receives the occupant. The airbag is further provided with a hollow portion penetrating in a left-right direction in a center surrounded by the upper inflation portion, the lower inflation portion, and the rear inflation portion, so as to reduce a volume thereof. Further, the occupant protection device includes a protrusion length adjustment unit that adjusts a protrusion length from the accommodation position to the restraint surface in the airbag. The protrusion length adjustment unit includes: an actuator configured with an electromagnetic solenoid or the like disposed at the accommodation position; and a strap having a tip end coupled to a rear inflation portion when the inflation is completed and having a base side locked to a locking pin of the actuator. The protrusion length adjustment unit further includes a camera serving as a detection unit capable of detecting a seating position of the occupant, and a control device that operates the actuator based on position data of the occupant from the camera. In the strap, the tip end side is coupled to the rear inflation portion, and the base side passes through the vicinity of an intersection portion between the upper inflation portion and the lower inflation portion of the airbag via the hollow portion, and is locked to the locking pin of the actuator disposed forward of the accommodation position. If the occupant is close to the accommodation position when the airbag is inflated, the protrusion length adjustment unit maintains a state where the base side of the strap is locked to the locking pin without operating the actuator, so as to shorten the protrusion length from the accommodation position of the airbag when the inflation is completed. If the occupant is far from the accommodation position when the airbag is inflated, the protrusion length adjustment unit actuates the actuator so as to move the locking pin, moves the locking pin to a position at which locking is to be released from the locking position of the strap, and releases the locking of the strap, so as to substantially increase the length from the accommodation position to the tip end side in the strap. In the occupant protection device, since the airbag is inflated such that the protrusion length from the accommodation position is shortened for an occupant seated close to the accommodation position, a short occupant seated close to the accommodation position can be suitably received. In addition, in the occupant protection device, since the airbag is inflated such that the protrusion length from the accommodation position is increased for an occupant seated far from the accommodation position, a tall occupant seated far from the accommodation position can be suitably received.

In the occupant protection device of the related art, an internal pressure of the airbag is substantially equal in the case where the airbag is inflated such that the protrusion length from the accommodation position is shortened for a short occupant that is close, and the case where the airbag is inflated such that the protrusion length from the accommodation position is increased with respect to the tall occupant that is far. However, a short occupant close to the accommodation position is preferably received by the airbag in a state where the internal pressure is reduced when the inflation is completed, and a tall occupant far from the accommodation position is preferably received by the airbag in which decrease in the internal pressure is prevented. As a solution thereof, an exhaust port (variable vent mechanism) can be disposed to adjust an exhaust amount such that in a case where the protrusion length of the airbag is shortened, surplus inflation gas is exhausted to reduce the internal pressure of the airbag when the inflation is completed, and conversely, in a case where the protrusion length of the airbag is increased, exhaust of the surplus inflation gas is prevented to maintain a high internal pressure of the airbag when the inflation is completed. However, in such case where the exhaust amount can be adjusted, it is necessary to provide an actuator for the variable vent mechanism separately from the actuator of the protrusion length adjustment unit, and it is difficult to easily adjust the exhaust amount.

SUMMARY

An object of the present invention is to provide an occupant protection device that can easily adjust an internal pressure of an airbag according to a magnitude of a protrusion length of the airbag when the airbag is inflated.

According to an aspect of the present invention, there is provided an occupant protection device including: an airbag configured to be folded and accommodated forward of a seated occupant in a vehicle, and configured to be deployed and inflated rearward from an accommodation position so as to receive an occupant when an inflation gas flows in, the airbag including, as inflating portions: an upper inflating portion and a lower inflating portion configured to extend rearward in a manner branched upward and downward from the accommodating position, and a rear inflating portion coupling rear ends of the upper inflating portion and the lower inflating portion, the rear inflating portion having a rear surface side configured to serve as a restraint surface that receives the occupant, the airbag being provided with a hollow portion penetrating in a left-right direction in a center surrounded by the upper inflation portion, the lower inflation portion, and the rear inflation portion; and a protrusion length adjustment unit configured to adjust a protrusion length from the accommodation position to the restraint surface in the airbag, where: an exhaust port configured to exhaust the inflation gas is disposed on an inner peripheral surface side in the vicinity of an intersection portion between the upper inflation portion and the lower inflation portion of the airbag; and in a case where the protrusion length by the protrusion length adjustment unit is adjusted to be long, the upper inflation portion and the lower inflation portion approach each other, so that an edge member approaches the exhaust port, thereby reducing an exhaust amount as compared to a case where the protrusion length is adjusted to be short.

In the occupant protection device according to the present invention, in a case where the protrusion length of the airbag is adjusted to be long by the protrusion length adjustment unit when the airbag is inflated, the exhaust amount of the inflation gas from the exhaust port is reduced and the internal pressure of the airbag can be maintained at a high level. Conversely, when the protrusion length of the airbag is adjusted to be short by the protrusion length adjustment unit, the exhaust amount of the inflation gas from the exhaust port is not reduced, and the internal pressure of the airbag can be reduced. That is, in a case where the airbag is inflated such that the protrusion length is increased, the airbag is to receive a tall occupant far from the accommodation position. At that time, the internal pressure of the airbag can be maintained at a high level, and the inflated airbag can suitably receive and protect the tall occupant. In addition, in a case where the airbag is inflated such that the protrusion length is shortened, the airbag is to receive a short occupant closes to the accommodation position. At that time, the internal pressure of the airbag can become low by increasing the exhaust amount, and the inflated airbag can suitably receive and protect the short occupant. In such adjustment of the exhaust amount of the exhaust port, the exhaust port is disposed in the inner peripheral surface side in the vicinity of the intersection portion between the upper inflating portion and the lower inflating portion of the airbag, such that when the upper inflating portion and the lower inflating portion approach each other, the edge member approaches the exhaust port, thereby reducing the exhaust amount. That is, in the case where the protrusion length of the airbag is large when the airbag is inflated, an angle between the upper inflating portion and the lower inflating portion becomes narrow, and the edge member on a peripheral edge of the exhaust port, for example, a peripheral wall of the upper inflating portion or the lower inflating portion, a member of the protrusion length adjustment unit, or the like approaches the exhaust port. Therefore, exhaust of the inflation gas from the exhaust port is interfered by the edge member and thus is prevented. In contrary, in the case where the protrusion length of the airbag is small when the airbag is inflated, the angle between the upper inflating portion and the lower inflating portion becomes wide, and the edge member on the peripheral edge of the exhaust port is separated from, rather than approaching, the exhaust port. Therefore, exhaust of the inflation gas from the exhaust port is smoothly performed without being interfered by the edge member. Accordingly, by simply opening the exhaust port in the inner peripheral surface side in the vicinity of the intersection portion between the upper inflating portion and the lower inflating portion of the airbag, and using the edge member close to the peripheral edge thereof to narrow or widen an opening area of the exhaust port, it is possible to simply adjust the exhaust amount from the exhaust port without using an actuator to provide a variable vent mechanism for narrowing or widening the opening area of the exhaust port.

Therefore, in the occupant protection device according to the present invention, it is possible to easily adjust the internal pressure of the airbag according to the magnitude of the protrusion length of the airbag when the airbag is inflated.

According to the aspect, when the protrusion length by the protrusion length adjustment unit is adjusted to be long, the exhaust port may be closed by approaching of the edge member.

In such a configuration, when the airbag is inflated such that the protrusion length is large, the exhaust port is closed by the edge member, and the airbag is maintained at a high pressure. Therefore, a tall occupant seated far from the accommodating position can be securely received and protected.

According to the aspect, the exhaust port may be open across the upper inflation portion and the lower inflation portion on the inner peripheral surface side of the intersection portion between the upper inflation portion and the lower inflation portion. Further, according to the aspect, the exhaust port may be open on either side among the upper inflation portion and the lower inflation portion on the inner peripheral surface side of the intersection portion between the upper inflation portion and the lower inflation portion.

According to the aspect, the protrusion length adjustment unit may include: a strap extending from the accommodation position; and an actuator configured to adjust a distance from the accommodation position to a tip end of the strap, the strap may connect the tip end extending from the accommodation position to the rear inflation portion via the hollow portion, and the actuator may be configured to maintain a holding state on a base side of the strap, so as to shorten the distance from the accommodation position to the tip end of the strap, when the actuator is not in operation, and to feed out the base side of the strap, so as to increase a substantial distance from the accommodation position to the tip end of the strap, when the actuator is in operation.

In such a configuration, when the inflation is completed, the rear inflation portion of the airbag is coupled to the tip end side of the strap extending from the accommodation position. The length from the accommodation position to the tip end of the strap is adjusted by the operation of the actuator, so that the longitudinal position of the rear inflation portion of the strap tip end is adjusted, and the protrusion length of the airbag can be directly adjusted via the length adjustment of the strap.

In such a configuration, when the strap is adjusted in a manner such that the distance from the accommodation position to the tip end of the strap is increased so as to increase the protrusion length, the strap may constitute the edge member to close the exhaust port.

According to the aspect, the protrusion length adjustment unit may include: a coupling tether including an upper member and a lower member that are respectively coupled to the upper inflating portion and the lower inflating portion across the hollow portion, and that have tip ends coupled to each other via a coupling member; and an actuator disposed at the accommodation position in a manner extending from the accommodation position and holding an end of the coupling member, and configured to operate to release holding of the coupling member when the actuator is in operation, when the actuator is in operation, the actuator may release the holding of the coupling member to maintain a separation distance between the upper inflation portion and the lower inflation portion by the coupling tether, thereby inflating the airbag such that the protrusion length is adjusted to be long, and when the actuator is not in operation, the actuator may hold the coupling member to remove the coupling member from a coupling portion between the upper member and the lower member in the coupling tether, so that coupling between the upper member and the lower member is released to increase the separation distance between the upper inflation portion and the lower inflation portion, thereby inflating the airbag such that the protrusion length is adjusted to be short.

In such a configuration, when the airbag is inflated such that the protrusion length is increased for a tall occupant seated far from the accommodation position, since the coupling tether restricts separation between the upper inflation portion and the lower inflation portion, the angle between the upper inflation portion and the lower inflation portion is narrowed, and the airbag is inflated such that the protrusion length is increased. In addition, even if the airbag receives the occupant by the restraint surface of the rear surface of the rear inflation portion, the upper inflation portion and the lower inflation portion are unlikely to separate from each other, and the exhaust amount from the exhaust port is also reduced. Due to such synergy, efficient reaction force is ensured, and the airbag can receive and protect a tall occupant seated far from the accommodating position. Of course, with respect to a short occupant seated close to the accommodation position, the coupling member is removed, the coupling tether is separated into the upper member and the lower member, and the upper inflation portion and the lower inflation portion are separated from each other. Accordingly, the airbag is inflated such that the protrusion length is shortened. At this time, when the airbag receives the occupant by the restraint surface of the rear surface of the rear inflation portion, the upper inflation portion and the lower inflation portion are separated from each other, exhaust from the exhaust port is not prevented, and the inner pressure of the airbag can be lowered. Therefore, increase of the reaction force is prevented, and the airbag can receive and protect a short occupant seated close to the accommodating position.

According to the aspect, the accommodation position may be an upper surface side of an instrument panel below a front windshield and forward of a seated occupant in the vehicle, and the airbag may be arranged such that when the airbag is inflated, an upper surface side of the upper inflation portion can be in contact with the front windshield, and a lower surface side of a front side of the lower inflation portion can be in contact with a rear surface side bent downward from an upper surface side of the instrument panel.

In such a configuration, when the airbag is inflated, the upper surface side of the upper inflation portion is in contact with the front windshield so that the upper inflation portion is supported, and the lower surface side on the front side of the lower inflation portion is supported from the upper surface side to the rear surface side of the instrument panel. Therefore, regardless of whether the protrusion length is long or short, the upper surface side of the upper inflating portion is supported by the front windshield, and at least the lower surface side of the front side of the lower inflating portion is supported by the instrument panel, so that a predetermined reaction force can be ensured, and the rear inflating portion, which couples the rear ends of the upper inflating portion and the lower inflating portion, can stably receive and protect the occupant by the restraint surface on the rear surface.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 14 is a schematic explanatory view illustrating the peripheral edge of the exhaust port and the vicinity of the actuator when the airbag according to the third embodiment is inflated in the large protrusion amount mode;

DETAILED DESCRIPTION OF THE INVENTION

Figure 1:
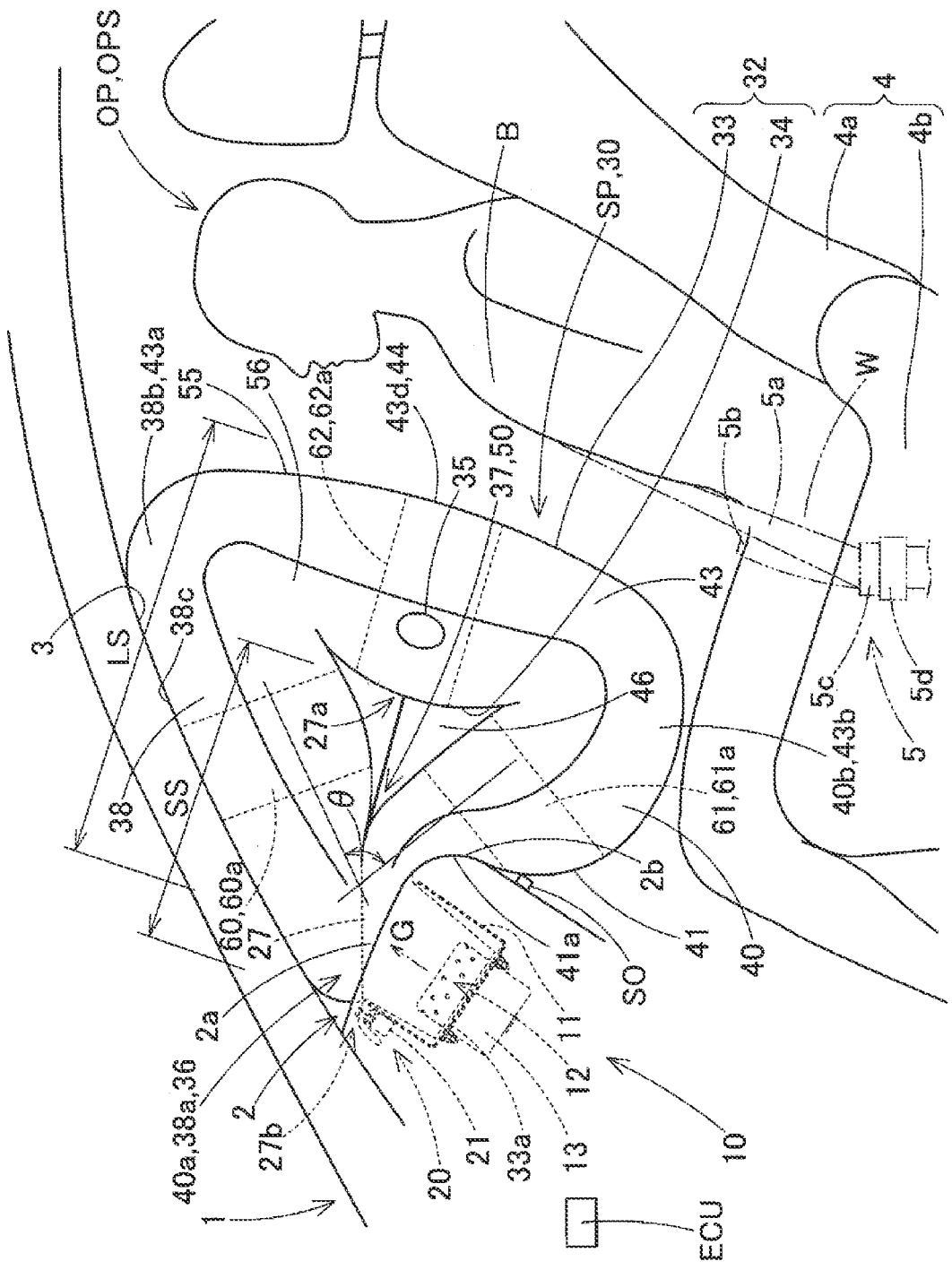
FIG. 1 is a diagram illustrating an operation state of an occupant protection device according to a first embodiment of the present invention, and is a schematic side view illustrating a state where inflation of an airbag is completed in a small protrusion amount mode.
Figure 2:
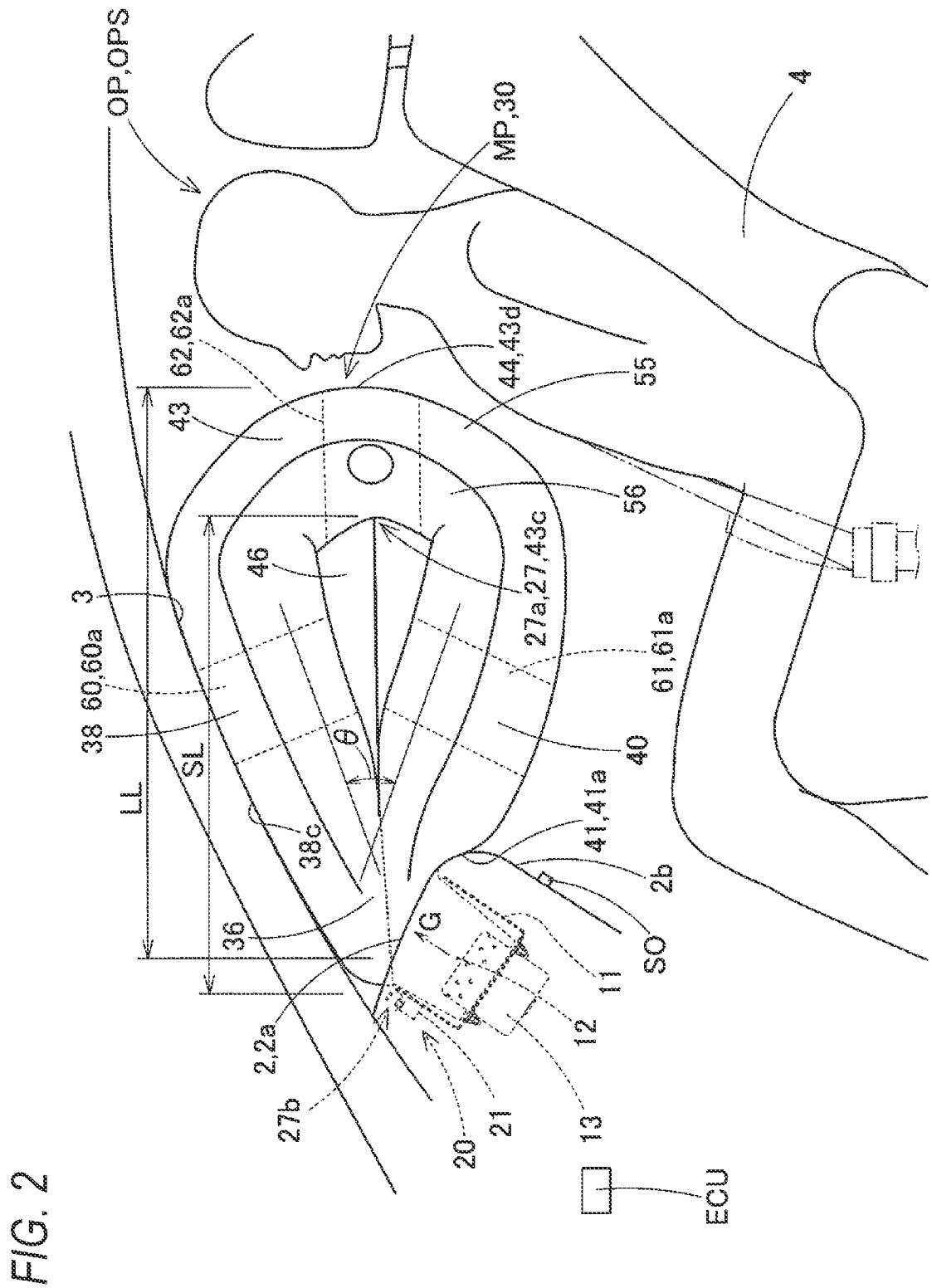
FIG. 2 is a diagram illustrating an operation state of the occupant protection device according to the first embodiment, and is a schematic side view illustrating a state where inflation of the airbag is completed in a large protrusion amount mode.

Hereinafter, an embodiment of the present invention will be described with reference to the drawings. As shown in FIGS. 1 and 2, an occupant protection device 10 according to a first embodiment is mounted on an upper surface 2a side of an instrument panel 2 below a windshield 3 forward of a front passenger seat of a vehicle 1.

A seat 4 of the front passenger seat on which an occupant OP is seated includes a backrest portion 4a and a seat portion 4b. The occupant OP is normally seated while wearing belts 5a and 5b of a seat belt device 5. A shoulder belt 5a extending from a tongue plate 5c for assembling to a buckle 5d is disposed forward of a chest B of the occupant OP, and a lap belt 5b extending from the tongue plate 5c is disposed forward of a waist W.

The occupant protection device 10 includes: an airbag 30, an inflator 13 that supplies inflation gas G to the airbag 30, a case 11 that accommodates the folded airbag 30, and a protrusion length adjustment unit 20 that adjusts a rearward protrusion length of the airbag 30 accommodated in the case 11 when the airbag 30 is inflated from the accommodation position 12.

The protrusion length adjustment unit 20 includes: an actuator 21 configured with an electromagnetic solenoid; a strap 27; a camera SO serving as a detection unit capable of detecting a seating position of the occupant OP; and a control device ECU that operates the actuator 21 based on position data of the occupant OP from the camera SO.

An operation of the inflator 13 and the actuator 21 of the occupant protection device 10 is controlled by the control device ECU. When the control device ECU receives a signal from a collision detection sensor disposed in a front bumper or the like that detects collision of the vehicle 1 and determines that the vehicle 1 has collided, the control device ECU actuates the inflator 13. When the inflator 13 is to be operated, the camera SO serves as an occupant detection unit that detects whether or not the seated occupant OP is close to the accommodation position 12 (the case 11). The control device ECU activates the actuator 21 if the camera SO determines that the occupant OP is seated far from the accommodation position 12, and does not activate the actuator 21 if the camera SO determines that the occupant OP is seated close to the accommodation position 12.

Figure 3:
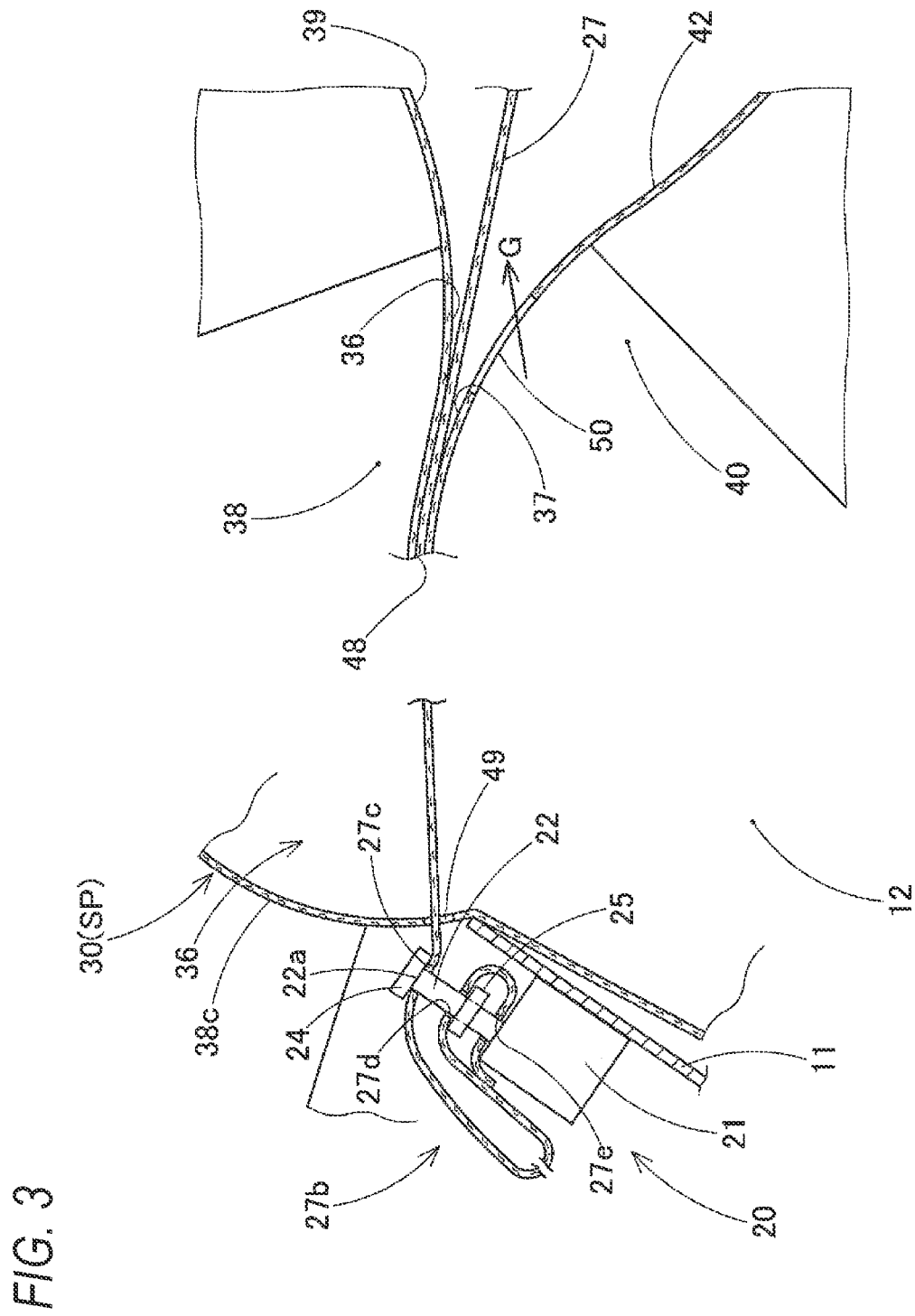
FIG. 3 is a schematic explanatory view illustrating a peripheral edge of an exhaust port and the vicinity of an actuator when the airbag according to the first embodiment is inflated in the small protrusion amount mode.
Figure 4:
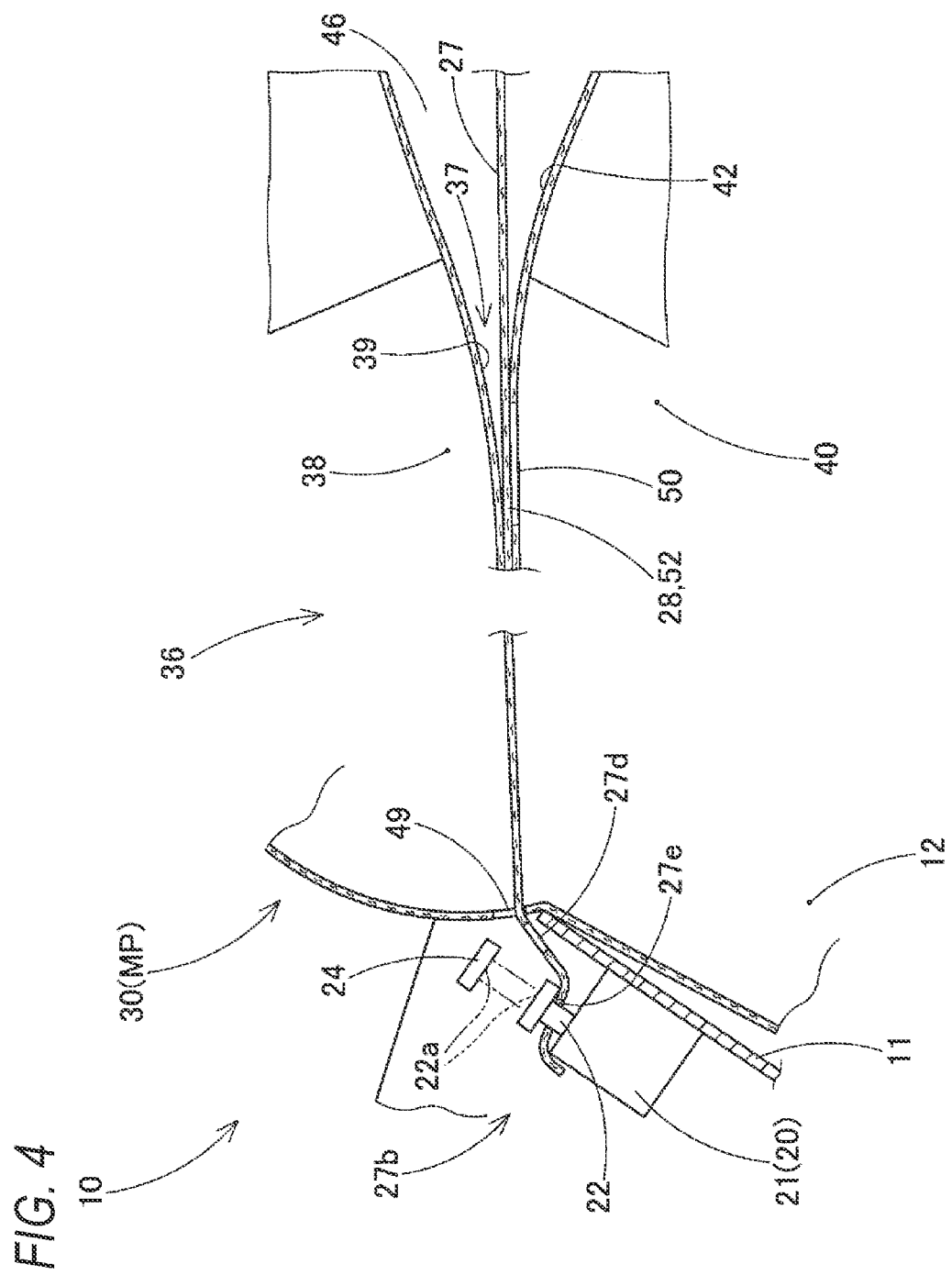
FIG. 4 is a schematic explanatory view illustrating the peripheral edge of the exhaust port and the vicinity of the actuator when the airbag according to the first embodiment is inflated in the large protrusion amount mode.

As shown in FIGS. 3 and 4, the actuator 21 is fixed to a front side of the case 11, which serves as the accommodation position 12, and causes a tip end (upper end) 22a side of a locking pin 22 to protrude upward so as to penetrate a guide 25 and come into contact with a stopper 24. The actuator 21 retracts the locking pin 22 such that the tip end 22a is separated from the stopper 24 and stops at a position of the guide 25 when the actuator 21 operates, and maintains a state where the tip end 22a of the locking pin 22 is in contact with the stopper 24 without retracting the locking pin 22 when the actuator 21 does not operate.

The strap 27 is formed in a belt shape from a woven fabric having flexibility such as polyester. The strap 27 has: a tip end 27a coupled to a rear inflating portion 43 to be described later (specifically, a front surface 43c of a region where a rear inner tether 62 to be described later is arranged) of the airbag 30 when the inflation is completed; and a base 27b side that passes through insertion holes 48 and 49 of the airbag 30 to be locked to the locking pin 22 of the actuator 21. The base 27b side of the strap 27 has a locking hole 27c, an insertion hole 27d, and an attachment hole 27e that are penetrated by the locking pin 22. When the actuator 21 operates, the attachment hole 27e is penetrated by the locking pin 22 even when the locking pin 22 is retracted until the tip end 22a reaches the guide 25. Therefore, when the locking pin 22 is retracted until the tip end 22a reaches the guide 25, the locking pin 22 is removed from the locking hole 27c and the insertion hole 27d, so that a substantial length from the base 27b side to the tip end 27a of the strap 27 becomes a longer length dimension SL from the attachment hole 27e to the tip end 27a (see FIG. 5). On the other hand, in a state where the actuator 21 is not operated, the locking pin 22 is in a state of locking the locking hole 27c, so that the length from the base 27b side to the tip end 27a of the strap 27 is a shorter length dimension SS from the locking hole 27c to the tip end 27a.

In the case in which the substantial length dimension of the strap 27 is the shorter length dimension SS, a protrusion length LS of the airbag 30 from the accommodation position 12 when the airbag 30 is inflated is shortened to a smaller protrusion amount mode SP (see FIG. 1). In the case in which the substantial length dimension of the strap 27 is the longer length dimension SL, a protrusion length LL of the airbag 30 from the accommodation position 12 when the airbag 30 is inflated is increased to a larger protrusion amount mode MP (see FIG. 2).

The strap 27 of the first embodiment has a closing portion 28 that is disposed in the vicinity of an intermediate portion between the tip end 27a and the base 27b and has a width capable of closing an exhaust port 50 of the airbag 30, which will be described later.

The accommodating position (accommodation portion) 12 of the airbag 30 is the upper surface side of the instrument panel 2 forward of the seat 4. As shown in FIGS. 1 and 2, the airbag 30 is deployed and inflated by the rearward protrusion amounts of the airbag 30 from the accommodation position 12 side when the inflation is completed of two types in the large protrusion amount mode MP and the small protrusion amount mode SP.

The airbag 30 includes: an upper inflating portion 38 and a lower inflating portion 40 that extend rearward in a manner branched upward and downward from the accommodating position 12 when the airbag 30 is inflated, and a rear inflating portion 43 coupling rear ends 38b, 40b of the upper inflating portion 38 and the lower inflating portion 40. The rear inflating portion 43 having a rear surface 43d side serving as a restraint surface 44 that receives the occupant OP. The airbag 30 is further provided with a hollow portion 46 penetrating in a left-right direction in a center surrounded by the upper inflation portion 38, the lower inflation portion 40, and the rear inflation portion 43.

When the inflation is completed, the airbag 30 is deployed and inflated between the windshield 3 and the instrument panel 2, an upper surface 38c side of the upper inflation portion 38 can be pressed into contact with the front windshield 3, and a front side 41a side of a lower surface 41 of the lower inflation portion 40 can be pressed into contact with a rear surface 2b side bent downward from the upper surface 2a side of the instrument panel 2.

A vent hole 35 is formed in the vicinity of both left and right edges on the hollow portion 46 side of the rear inflating portion 43 of the airbag 30 for exhausting the inflation gas G in an early stage of inflation.

The airbag 30 has a peripheral wall 32 constituted by two pieces including: an outer panel 55 constituting an outer peripheral wall 33 on an outer peripheral surface side when the airbag 30 is inflated; and an inner panel 56 constituting an inner peripheral wall 34 on an inner peripheral surface side when the airbag 30 is inflated. The upper inflation portion 38, the lower inflation portion 40, and the rear inflation portion 43 are respectively provided with an upper inner tether 60, a lower inner tether 61, and a rear inner tether 62 inside, so as to restrict thickness dimensions thereof. The tethers 60, 61, 62 are each coupled to the outer panel 55 and the inner panel 56, and are respectively formed of divided fabrics 60a, 61a, 62a coupled to each other. The panels 55, 56 and the divided fabrics 60a, 61a, 62a are each formed of woven fabric such as polyester.

A lower surface of the outer peripheral wall 33 on the front end 40a side of the lower inflation portion 40 is provided with an inflow opening 33a that opens in order to allow the inflation gas G to flow into the airbag 30. A peripheral edge of the inflow opening 33a is attached to the case 11 as an attachment seat. An upper portion of the inflator 13 attached to the case 11, which is provided with a gas discharge port, is inserted into the airbag 30 through the inflow opening 33a.

The airbag 30 is provided with two insertion holes 48 and 49 penetrated by the strap 27 of the protrusion length adjustment unit 20. The insertion hole 48 is open in the inner peripheral wall 34 as an intersection portion between the upper inflation portion 38 and the lower inflation portion 40. The insertion hole 49 is open in the upper surface 38c side of a front end 38a of the upper inflation portion 38 in the vicinity of the locking pin 22 of the actuator 21. More specifically, the insertion hole 48 is formed by an unsewn portion formed when ends 56a, 56b of the inner panel 56 are sewn to each other (see FIG. 5).

The exhaust port 50 capable of exhausting the inflation gas G is disposed on the inner peripheral surface 37 side in the vicinity of a front end 36 as an intersection portion between the upper inflation portion 38 and the lower inflation portion 40 of the airbag 30. In the first embodiment, the exhaust port 50 is opened in a substantially circular shape in the upper surface 42 on the lower inflation portion 40 side on the inner peripheral surface 37 side in the vicinity of the front end 36.

In a case where the protrusion length by the protrusion length adjustment unit 20 is adjusted to be long, the upper inflation portion 38 and the lower inflation portion 40 approach each other, so that an edge member 52 approaches the exhaust port 50, thereby reducing an exhaust amount as compared to a case where the protrusion length is adjusted to be short. Specifically, in the case of the first embodiment, the strap 27 constitutes the edge member 52. More specifically, the closing portion 28, which is a portion widened from the base 27b side toward the tip end 27a side, constitutes the edge member 52.

Figure 5:
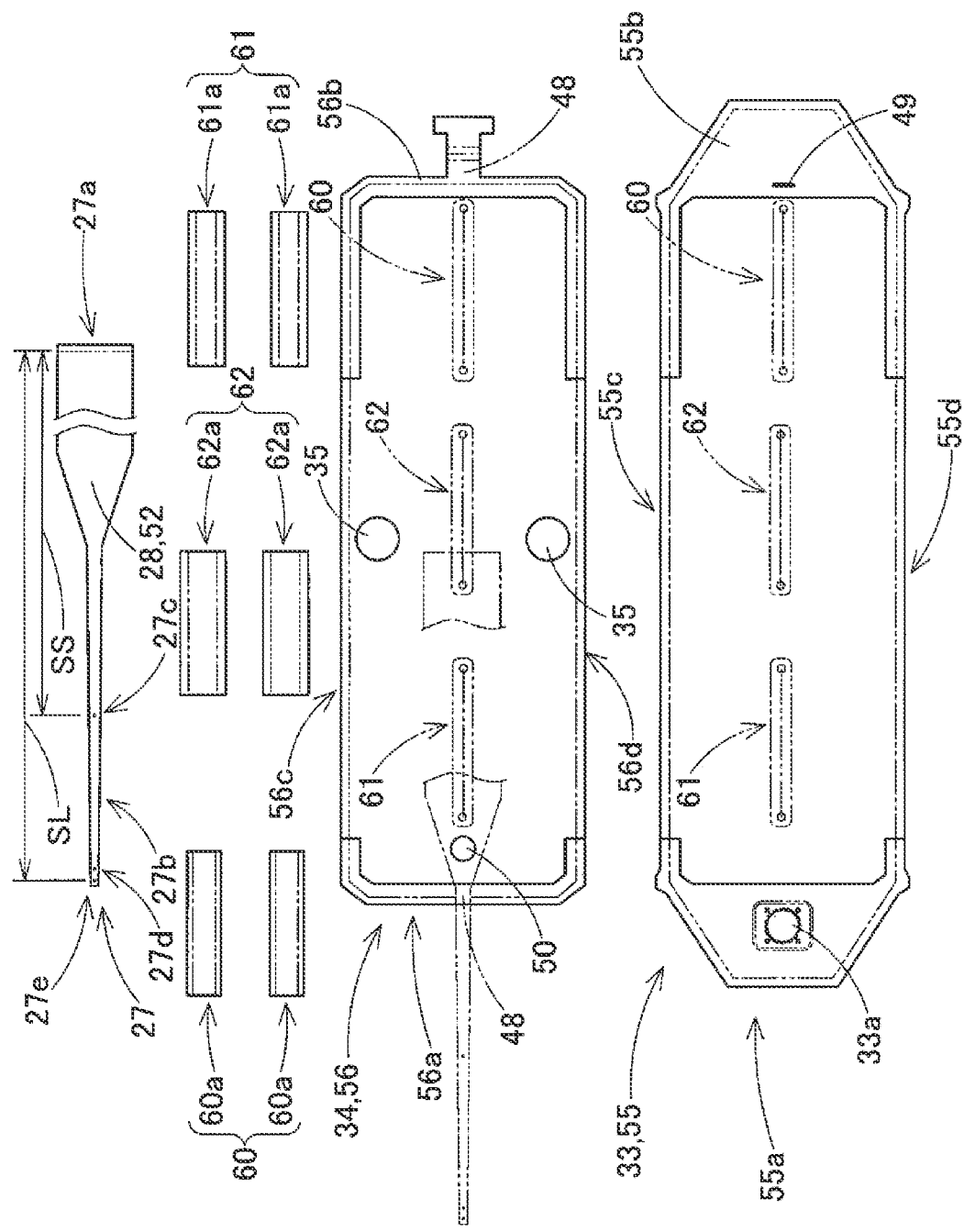
FIG. 5 is a plan view illustrating a constituent material of the airbag according to the first embodiment.

As shown in FIG. 5, members constituting the airbag 30 include: the outer panel 55 constituting the outer peripheral wall 33 of the peripheral wall 32; the inner panel 56 constituting the inner peripheral wall 34 of the peripheral wall 32; and the divided fabrics 60a, 61a, 62a forming the tethers 60, 61, 62. The outer panel 55 and the inner panel 56 are each provided with a reinforcing fabric (not shown) disposed on both ends 55a, 55b, 56a, 56b on the front end 36 side of the airbag 30. A reinforcing fabric (not shown) is also disposed at a portion of the inflow opening 33a of the outer panel 55.

At the time of manufacturing the airbag 30, the divided fabrics 60a, 61a, 62a and the reinforcing fabrics are sewn to predetermined positions in the inner panel 56 and the outer panel 55 where the vent hole 35 and the exhaust port 50 are provided, the tip end 27a of the strap 27 is sewn to the inner panel 56, the ends 56a, 56b of the inner panel 56 are sewn to each other, the divided fabrics 60a, 61a, 62a sewn to the inner panel 56 and the outer panel 55 are sewn to each other to form the tethers 60, 61, 62, edges 55c, 56c and edges 55d, 56d in the width direction of the inner panel 56 and the outer panel 55 are sewn to each other, respectively, and the ends 55a, 55b of the outer panel 55 are sewn to each other. Thereby, the peripheral wall 32 provided with the tethers 60, 61, 62, that is, the airbag 30 can be manufactured. The strap 27, whose tip end 27a is sewn to the inner panel 56, is inserted into the insertion hole 48 at an unsewn portion when the ends 56a, 56b of the inner panel 56 are sewn to each other on the base 27b side, and, is inserted into the insertion hole 49 and pulled out of the airbag 30 when the ends 55a, 55b of the outer panel 55 are sewn to each other.

The airbag 30 manufactured in this manner is folded so as to be accommodated in the case 11, and the attachment seat on the peripheral edge of the inflow opening 33a is attached to the case 11. Moreover, the inflator 13 is attached to the case 11, and the locking pin 22 is inserted into the attachment hole 27e, the insertion hole 27d, and the locking hole 27c so as to couple the base 27b side of the strap 27 to the actuator 21. Further, the case 11 is coupled and fixed to a vehicle body side member (not shown) of the vehicle 1 below the instrument panel 2. Thereby, the occupant protection device 10 can be mounted on the vehicle 1.

When the occupant protection device 10 is to be mounted on the vehicle 1, a lead wire (not shown) for inputting an operation signal is coupled to the inflator 13 and the actuator 21. The lead wire extends from the control device ECU, which is disposed at a predetermined position. Further, a camera SO capable of detecting a seating position of the occupant OP is disposed on the rear surface 2b side of the instrument panel 2. The control device ECU receives a position detection signal of the occupant OP from the camera SO and a collision signal of the vehicle 1.

When the vehicle 1 collides after the occupant protection device 10 according to the first embodiment is mounted to the vehicle 1, the control device ECU detects the collision of the vehicle 1. If the control device ECU determines that the occupant OP is seated at a position far from the accommodation position 12 by the signal from the camera SO serving as the occupant detection unit, the control device ECU actuates the inflator 13 to inflate the airbag 30, and actuates the actuator 21 of the protrusion length adjustment unit 20 so as to increase the protrusion length LL of the airbag 30. Then, the strap 27 of the protrusion length adjustment unit 20 is fed out long from the accommodation position 12, and as shown in FIGS. 2 and 4, the closing portion 28 of the strap 27 closes the exhaust port 50, so that the exhaust amount of the inflation gas G from the exhaust port 50 is reduced, and the internal pressure of the airbag 30 can be maintained at a high level. In contrast, after the control device ECU detects the collision of the vehicle 1, if the control device ECU determines that the occupant OP is seated at a position near the accommodation position 12 by the signal from the camera SO serving as the occupant detection unit, the control device ECU actuates the inflator 13 to inflate the airbag 30, and does not actuate the actuator 21 of the protrusion length adjustment unit 20 so as to shorten the protrusion length LS of the airbag 30. Then, the strap 27 of the protrusion length adjustment unit 20 is not fed out long from the accommodation position 12, and the closing portion 28 of the strap 27 does not close the exhaust port 50, so that the exhaust amount of the inflation gas G from the exhaust port 50 is not reduced, and the internal pressure of the airbag 30 can be lowered (see FIGS. 1 and 3).

That is, in the first embodiment, in a case where the airbag 30 is inflated such that the protrusion length LL is increased, the airbag 30 is to receive a tall occupant OPE far from the accommodation position 12 as shown in FIG. 2. At that time, the internal pressure of the airbag 30 can be maintained at a high level, and the inflated airbag 30 can suitably receive and protect the tall occupant OPE. In addition, in a case where the airbag 30 is inflated such that the protrusion length LS is shortened, the airbag 30 is to receive a short occupant OPS close to the accommodation position 12 as shown in FIG. 1. At that time, the internal pressure of the airbag 30 can become low by increasing the exhaust amount, and the inflated airbag 30 can suitably receive and protect the short occupant. In such adjustment of the exhaust amount of the exhaust port 50, the exhaust port 50 is disposed in the inner peripheral surface 37 side in the vicinity of the intersection portion 36 between the upper inflating portion 38 and the lower inflating portion 40 of the airbag, such that when the upper inflating portion 38 and the lower inflating portion 40 approach each other, the closing portion 28 of the strap 27 serving as the edge member 52 approaches the exhaust port, thereby reducing the exhaust amount. That is, in the case where the protrusion length LL of the airbag 30 is large when the airbag 30 is inflated, an angle θ between the upper inflating portion 38 and the lower inflating portion 40 becomes narrow (see FIG. 2), and the edge member 52 on the peripheral edge of the exhaust port 50 (the strap 27 of the protrusion length adjustment unit 20 as in the first embodiment) approaches the exhaust port 50. Therefore, exhaust of the inflation gas G from the exhaust port 50 is interfered by the edge member 52 and thus is prevented (see FIG. 4). In contrary, in the case where the protrusion length LS of the airbag 30 is small when the airbag 30 is inflated, the angle θ between the upper inflating portion 38 and the lower inflating portion 40 becomes wide as illustrated in FIGS. 1 and 3, and the edge member 52 on the peripheral edge of the exhaust port 50 is separated from, rather than approaching, the exhaust port 50. Therefore, exhaust of the inflation gas G from the exhaust port 50 is smoothly performed without being interfered by the edge member 52. Accordingly, by simply opening the exhaust port 50 in the inner peripheral surface 37 side in the vicinity of the intersection portion 36 between the upper inflating portion 38 and the lower inflating portion 40 of the airbag 30, and using the edge member 52 close to the peripheral edge thereof to narrow or widen an opening area of the exhaust port 50, it is possible to simply adjust the exhaust amount from the exhaust port 50 without using an actuator to provide a variable vent mechanism for narrowing or widening the opening area of the exhaust port.

Therefore, in the occupant protection device 10 according to the first embodiment, it is possible to easily adjust the internal pressure of the airbag 30 according to the magnitude of the protrusion length LL, LS of the airbag 30 when the airbag 30 is inflated.

In the occupant protection device 10 according to the first embodiment, the accommodation position 12 is the upper surface 2a side of the instrument panel 2 below the front windshield 3 and forward of the seated occupant OP in the vehicle 1. The airbag 30 is arranged such that when the airbag 30 is inflated, the upper surface 38c side of the upper inflation portion 38 can be in contact with the front windshield 3, and a lower surface 41a side of a front side of the lower inflation portion 40 can be in contact with the rear surface 2b side bent downward from the upper surface 2a side of the instrument panel 2.

Therefore, in the first embodiment, when the airbag 30 is inflated, the upper surface 38c side of the upper inflation portion 38 is in contact with (is pressed into contact with) the front windshield 3 so that the upper inflation portion 38 is supported, and the lower surface 41a side on the front side of the lower inflation portion 40 is supported from the upper surface 2a side to the rear surface 2b side of the instrument panel 2. Therefore, regardless of whether the protrusion length LL is long or the protrusion length LS is short, the upper surface 38c side of the upper inflating portion 38 is supported by the front windshield 3, and at least the lower surface 41a side of the front side of the lower inflating portion 40 is supported by the instrument panel 2, so that a predetermined reaction force can be ensured, and the rear inflating portion 43, which couples the rear ends 38b, 40b of the upper inflating portion 38 and the lower inflating portion 40, can stably receive and protect the occupant OP by the restraint surface 44 on the rear surface 43d. In other words, the upper surface 38c of the upper inflation portion 38 is supported by the front windshield 3, and the lower surface 41a on the front side of the lower inflation portion 40 is supported by the upper surface 2a and the rear surface 2b of the instrument panel 2. Therefore, when the airbag 30 is expanded in a substantially triangular ring shape when viewed from a lateral side, the airbag 30 does not extend excessively even if the upper inflation portion 38 and the lower inflation portion 40 are inflated so as to extend rearward in a manner branched upward and downward from the accommodation position 12. That is, even though the hollow portion 46 is provided therebetween, when the inflated airbag 30 receives the occupant OP moving forward by the restraint surface 44 of the rear inflating portion 43 coupling the rear ends 38b, 40b, the upper inflating portion 38 and the lower inflating portion 40 can receive the occupant OP so that the upper inflating portion 38 and the lower inflating portion 40 are compressed and deformed along respective axial directions thereof, thereby securing a sufficient reaction force to receive and protect the occupant OP. In a case of the embodiment, when the airbag 30 is inflated by the short protrusion length LS, the upper inflation portion 38 is in a state where the upper surface 38c is pressed into contact with the front windshield 3 in the same manner as in the state of the long protrusion length LL. On the other hand, the lower inflation portion 40 is inflated in a manner of being inclined downward while the lower surface 41 thereof is in long contact with the rear surface 2b of the instrument panel 2, and thus has a wider angle θ from the upper inflation portion 38.

In the first embodiment, when the protrusion length LL is to be adjusted long by the protrusion length adjustment unit 20, the exhaust port 50 is closed upon approach of the edge member 52 (the closing portion 28 of the strap 27).

Therefore, in the first embodiment, when the airbag 30 is inflated such that the protrusion length LL is large, the exhaust port 50 is closed by the closing portion 28 of the edge member 52, and the airbag 30 is maintained at a high pressure. Therefore, the tall occupant OPE seated far from the accommodating position 12 can be securely received and protected.

In the first embodiment, the exhaust port 50 is open to the inner peripheral surface 37 on the lower inflation portion 40 side in the vicinity of the intersection portion 36 of the airbag 30. However, as in an airbag 30A of an occupant protection device 10A according to a second embodiment shown in FIGS. 6 to 10, an exhaust port 50A may be open over the upper inflation portion 38 and the lower inflation portion 40 on the inner peripheral surface 37 side in the vicinity of the intersection portion 36 between the upper inflation portion 38 and the lower inflation portion 40. Further, as in an airbag 30B of an occupant protection device 10B according to a third embodiment illustrated in FIGS. 11 to 14, an exhaust port 50B may be open in the inner peripheral surface 37 on the upper inflation portion 38 side in the vicinity of the intersection portion 36 between the upper inflation portion 38 and the lower inflation portion 40.

Figure 6:
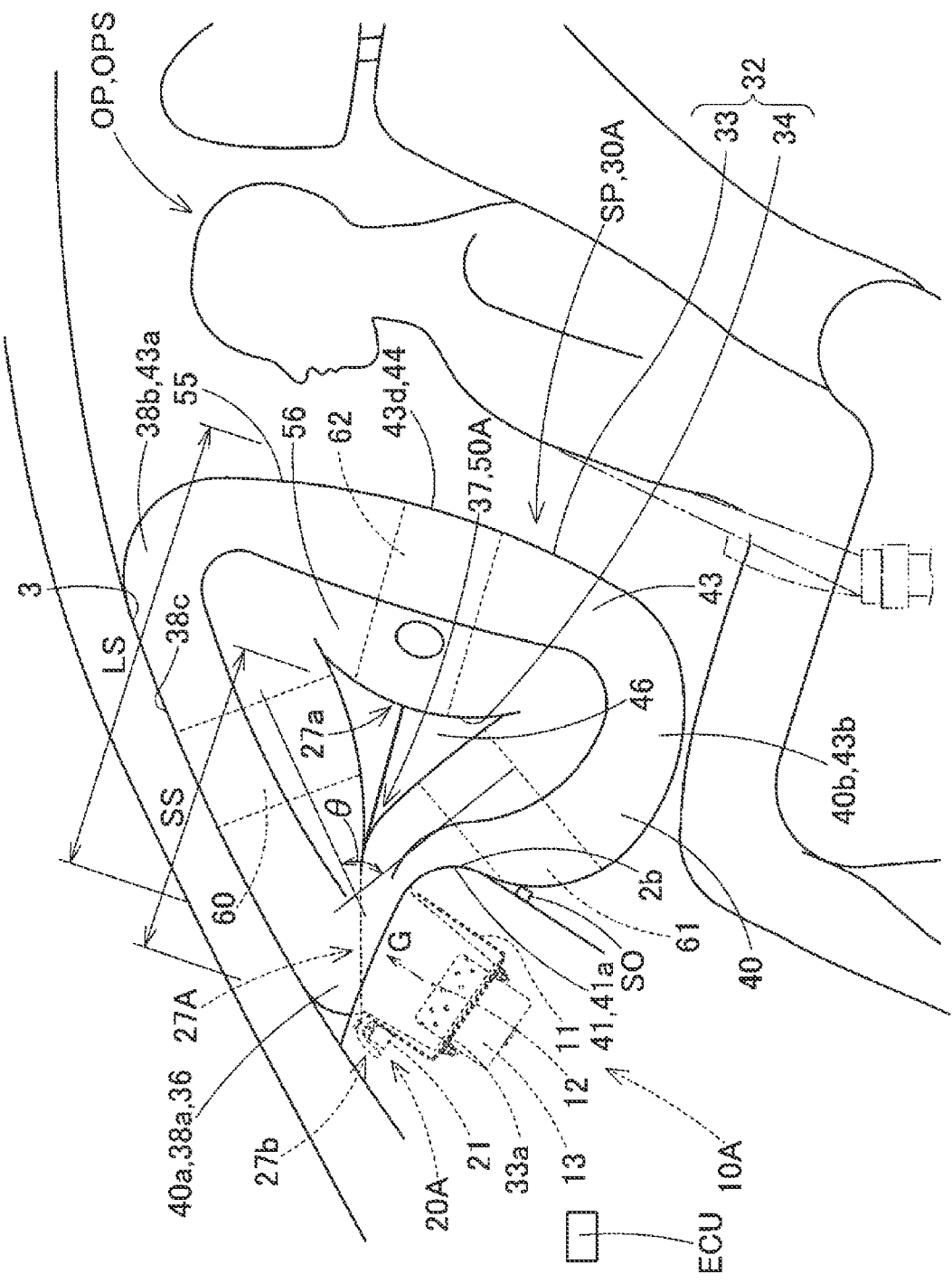
FIG. 6 is a diagram illustrating an operation state of an occupant protection device according to a second embodiment, and is a schematic side view illustrating a state where inflation of an airbag is completed in the small protrusion amount mode.
Figure 7:
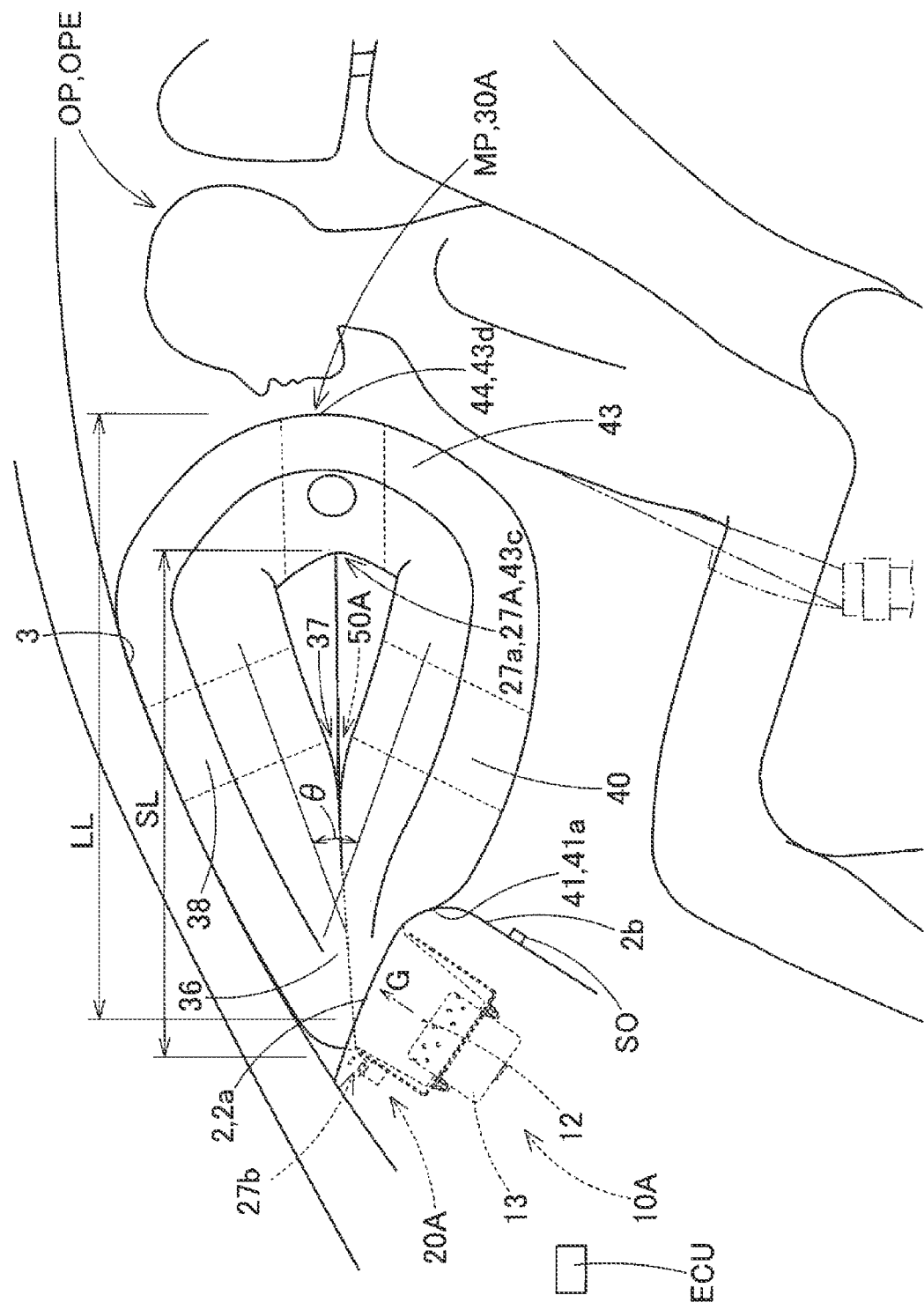
FIG. 7 is a diagram illustrating an operation state of the occupant protection device according to the second embodiment, and is a schematic side view illustrating a state where inflation of the airbag is completed in the large protrusion amount mode.
Figure 8:
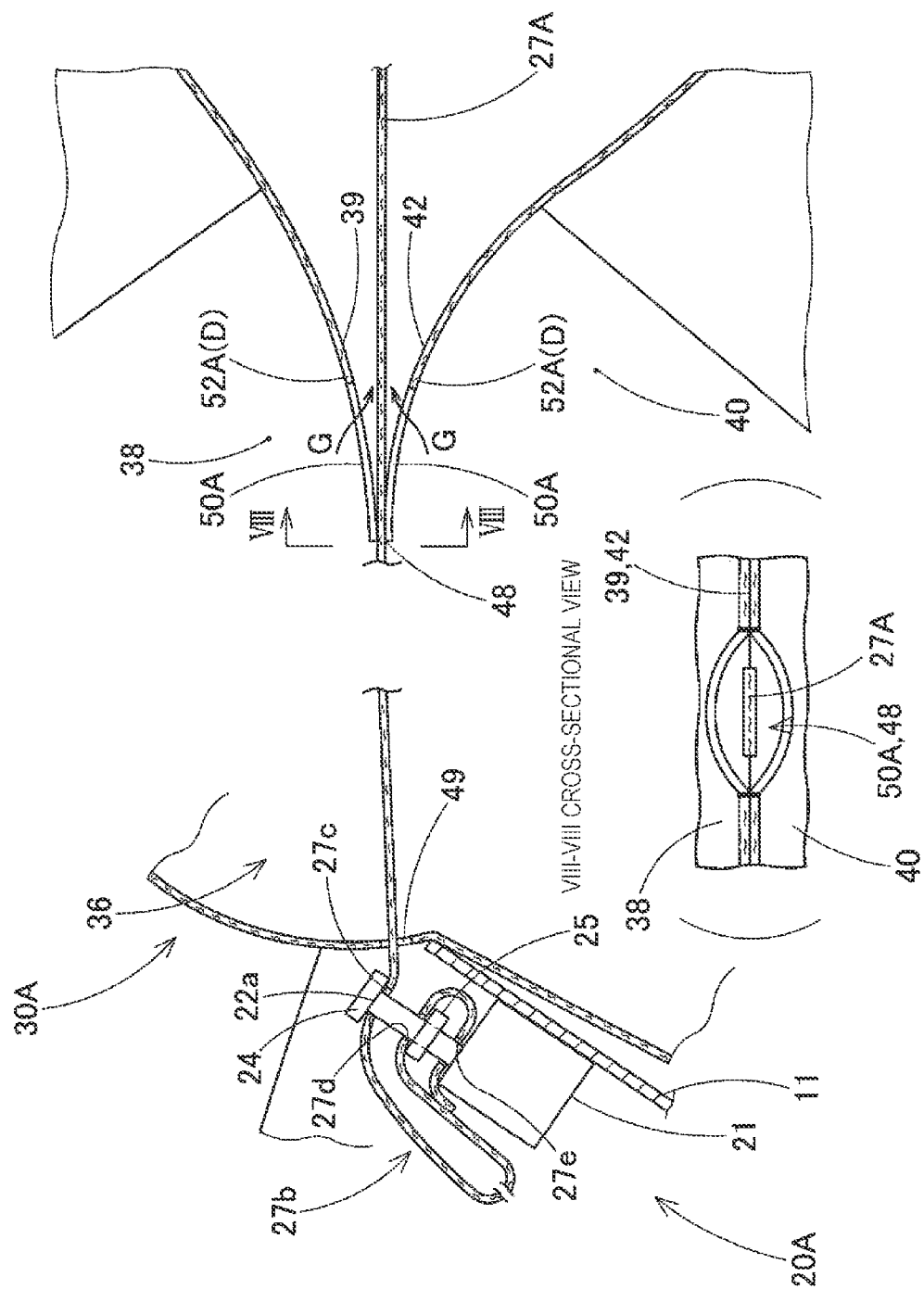
FIG. 8 is a schematic explanatory view illustrating a peripheral edge of an exhaust port and the vicinity of an actuator when the airbag according to the second embodiment is inflated in the small protrusion amount mode.
Figure 9:
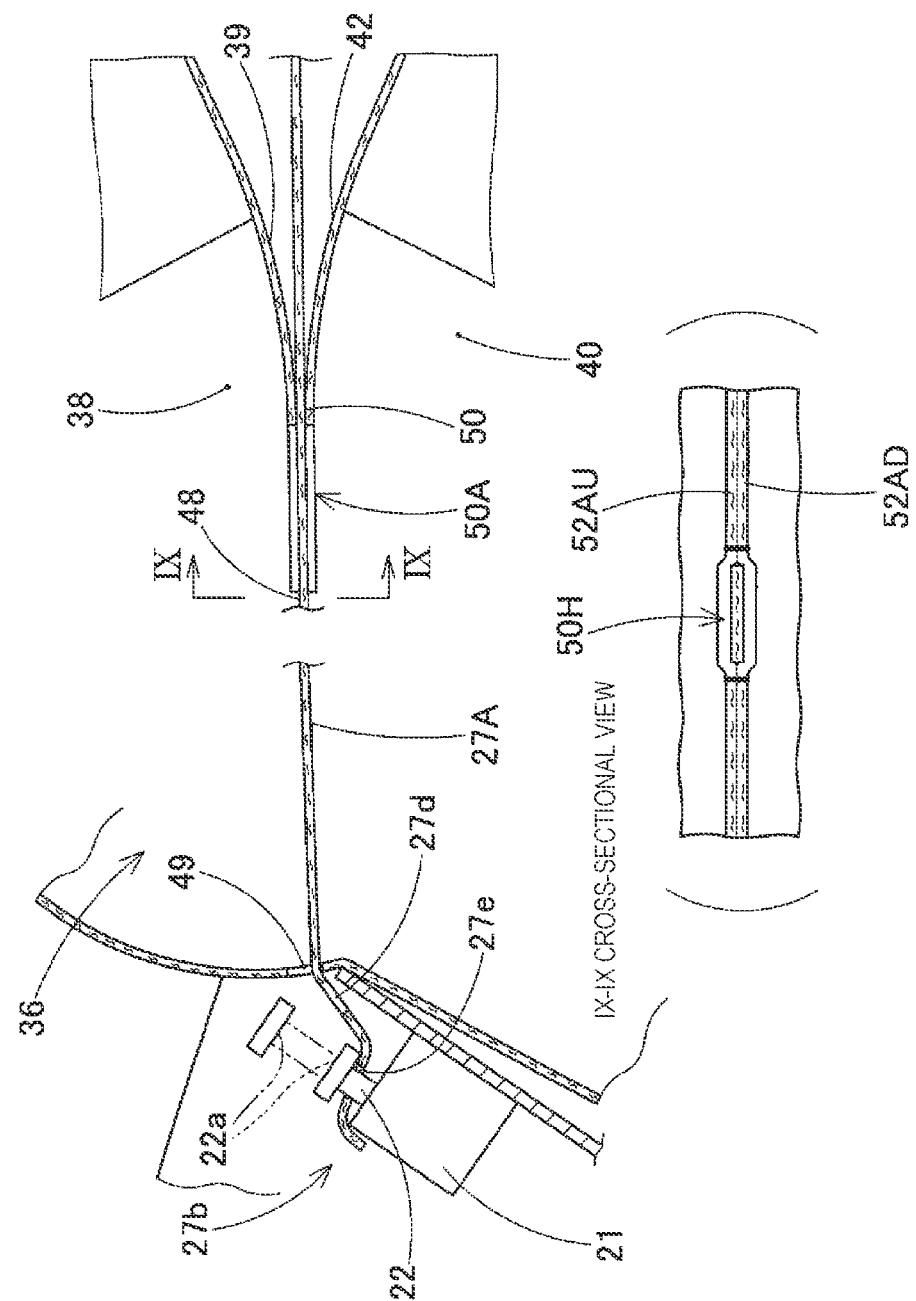
FIG. 9 is a schematic explanatory view illustrating the peripheral edge of the exhaust port and the vicinity of the actuator when the airbag according to the second embodiment is inflated in the large protrusion amount mode.
Figure 10:
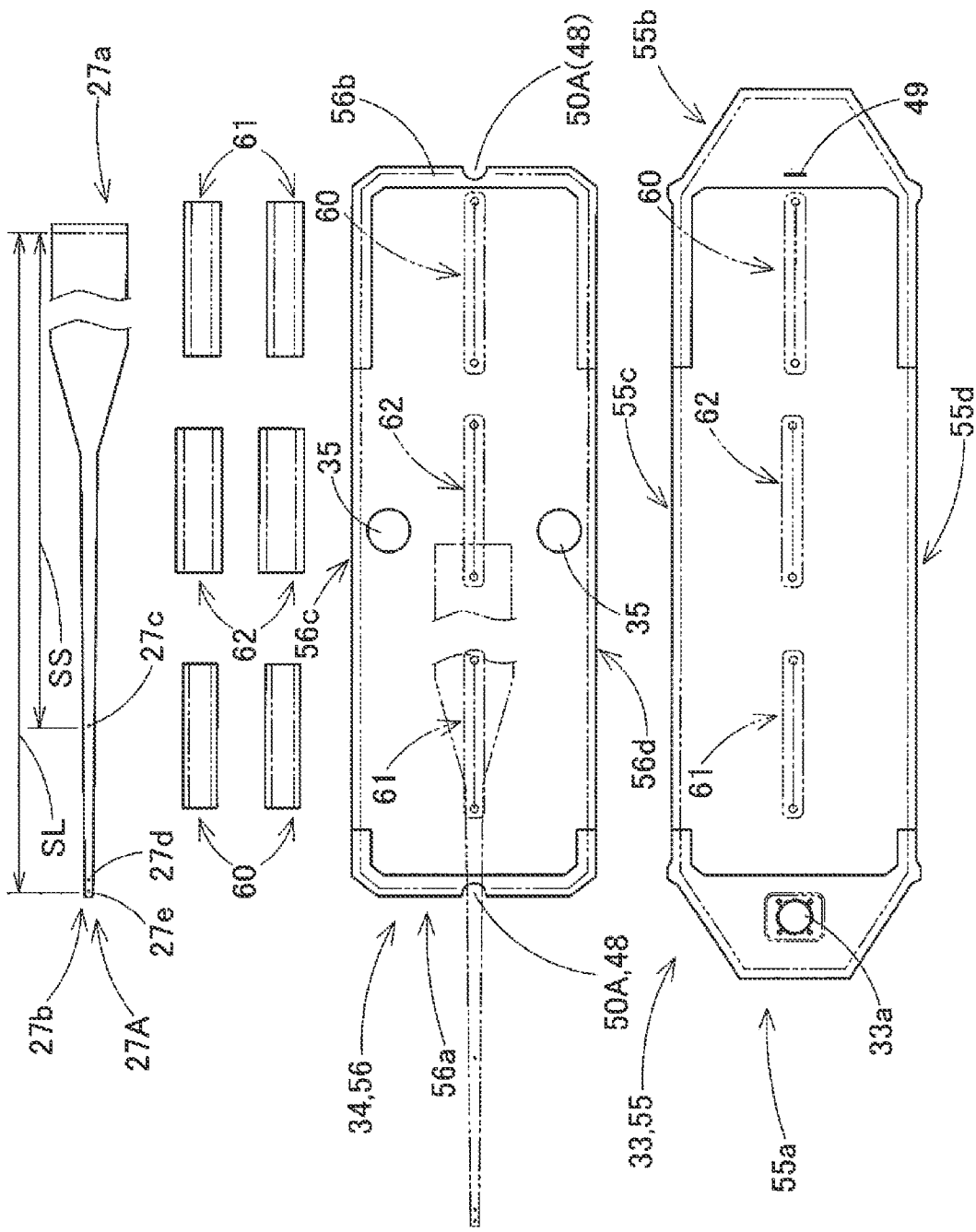
FIG. 10 is a plan view illustrating a constituent material of the airbag according to the second embodiment.

In the occupant protection device 10A according to the second embodiment illustrated in FIGS. 6 to 10, in the case where the protrusion length LL of the airbag 30A is large, the angle θ between the upper inflating portion 38 and the lower inflating portion 40 becomes narrow as illustrated in FIGS. 7 and 9, and an edge member 52A on a peripheral edge of the exhaust port 50A (peripheral edges 52AU, 52AD of the exhaust port 50A in the lower surface 39 of the upper inflating portion 38 and the upper surface 42 of the lower inflating portion 40 as in the second embodiment) approaches the exhaust port 50A. Therefore, exhaust of the inflation gas G from the exhaust port 50A is interfered by the edge member 52A and thus is prevented (see FIG. 9). In contrary, in the case where the protrusion length LS of the airbag 30A is small when the airbag 30A is inflated, the angle θ between the upper inflating portion 38 and the lower inflating portion 40 becomes wide as illustrated in FIGS. 6 and 8, and the edge member 52A on the peripheral edge of the exhaust port 50A is separated from, rather than approaching, the exhaust port 50A. Therefore, exhaust of the inflation gas G from the exhaust port 50A is smoothly performed without being interfered by the edge member 52A.

Therefore, in the occupant protection device 10A according to the second embodiment as well, it is possible to easily adjust the internal pressure of the airbag 30A according to the magnitude of the protrusion length LL, LS of the airbag 30A when the airbag 30A is inflated.

A protrusion length adjustment unit 20A of the occupant protection device 10A according to the second embodiment uses the actuator 21 similar to that of the first embodiment and a strap 27A, whereas the strap 27A may not include the closing portion 28. In the second embodiment as well, if the control device ECU determines that the occupant OP is seated at a position away from the accommodation position 12 by the signal from the camera SO serving as the occupant detection unit, the control device ECU actuates the inflator 13 to inflate the airbag 30A, and actuates the actuator 21 of the protrusion length adjustment unit 20A so as to pull out a locking pin 21a from the locking hole 27c and the insertion hole 27d of the strap 27A, thereby increasing the protrusion length LL of the airbag 30. Then, the strap 27A of the protrusion length adjustment unit 20 is fed out long from the accommodation position 12 (see FIGS. 7 and 9), and the exhaust port 50A is closed by the edge member 52A. If the control device ECU determines that the occupant OP is seated at a position near the accommodation position 12 by the signal from the camera SO serving as the occupant detection unit, the control device ECU actuates the inflator 13 to inflate the airbag 30A, and does not actuate the actuator 21 of the protrusion length adjustment unit 20A so as to shorten the protrusion length LS of the airbag 30A. If the actuator 21 is not actuated, the strap 27A of the protrusion length adjustment unit 20 is not fed out long from the accommodation position 12 (see FIGS. 6 and 8), and the exhaust port 50A is not closed by the edge member 52A.

Figure 11:
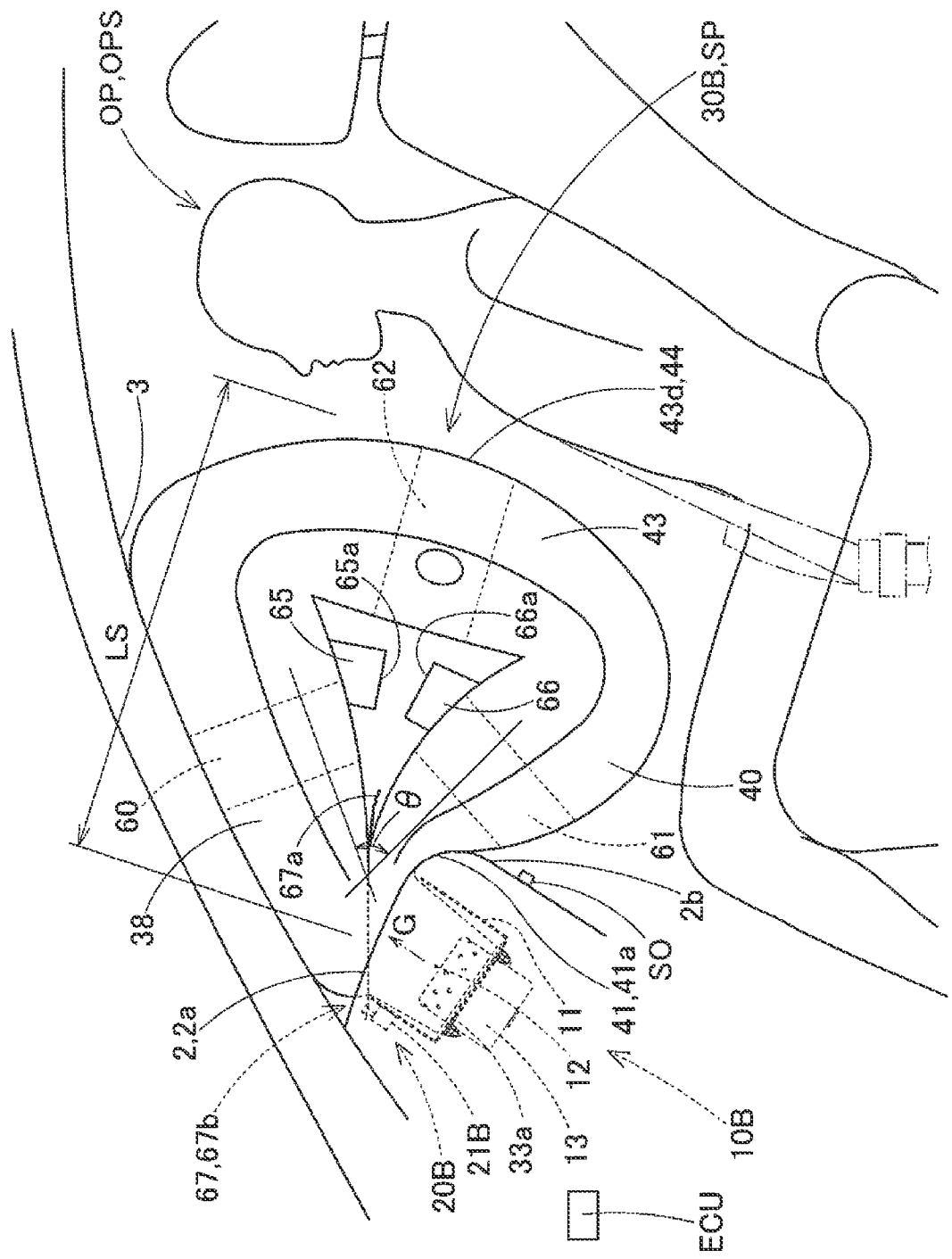
FIG. 11 is a diagram illustrating an operation state of an occupant protection device according to a third embodiment, and is a schematic side view illustrating a state where inflation of an airbag is completed in the small protrusion amount mode.
Figure 12:
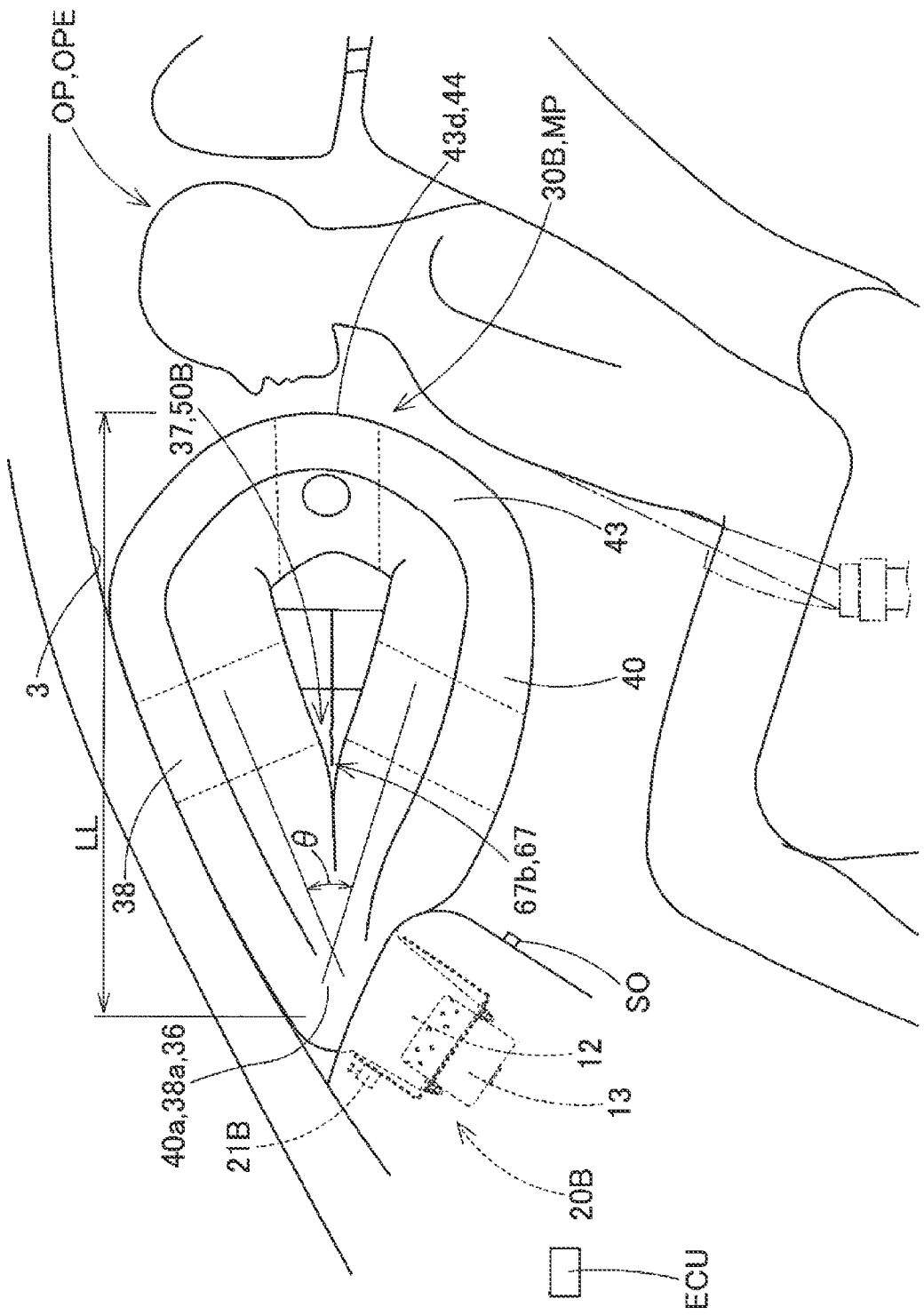
FIG. 12 is a diagram illustrating an operation state of the occupant protection device according to the third embodiment, and is a schematic side view illustrating a state where inflation of the airbag is completed in the large protrusion amount mode.
Figure 13:
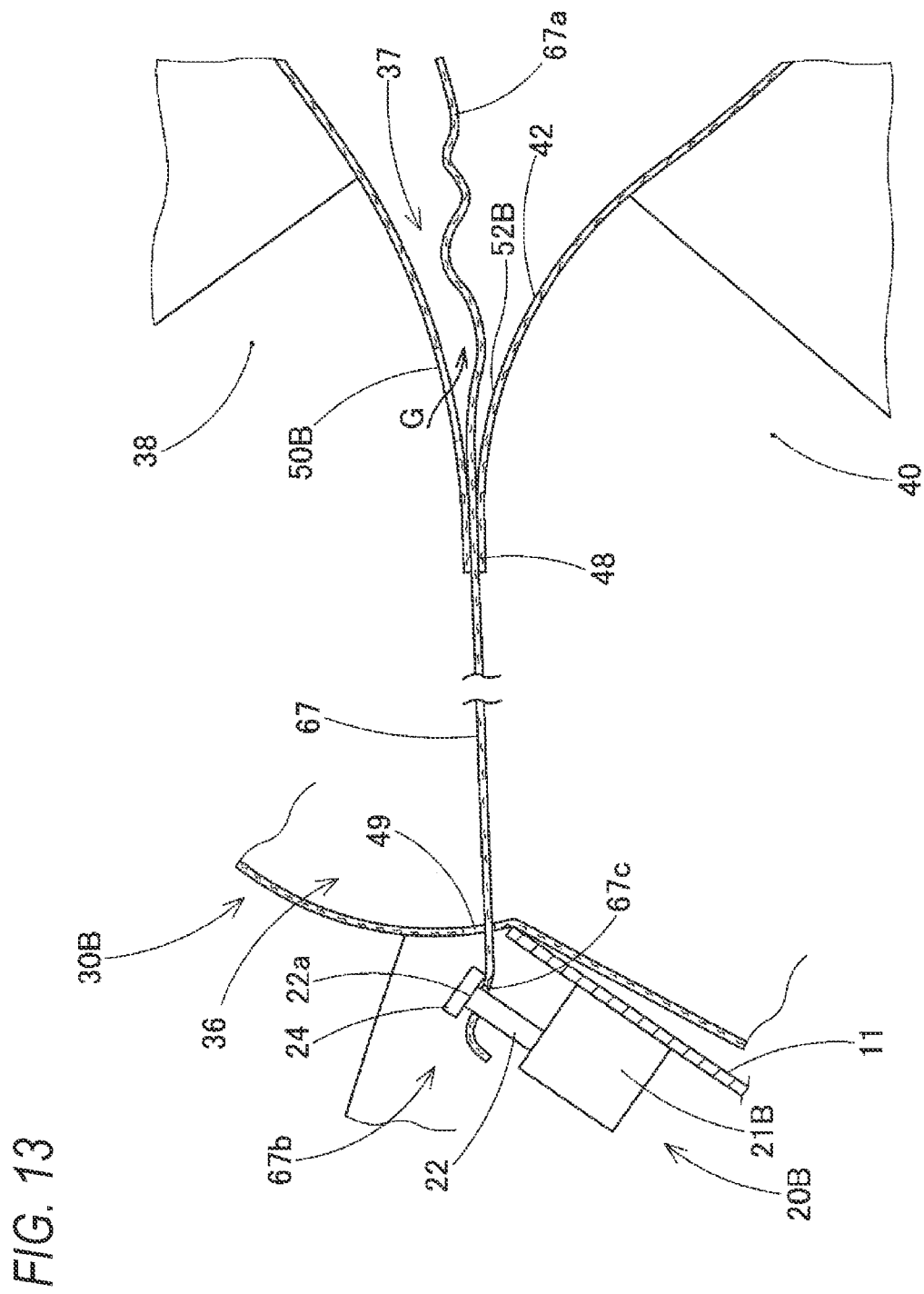
FIG. 13 is a schematic explanatory view illustrating a peripheral edge of an exhaust port and the vicinity of an actuator when the airbag according to the third embodiment is inflated in the small protrusion amount mode.
Figure 15A:
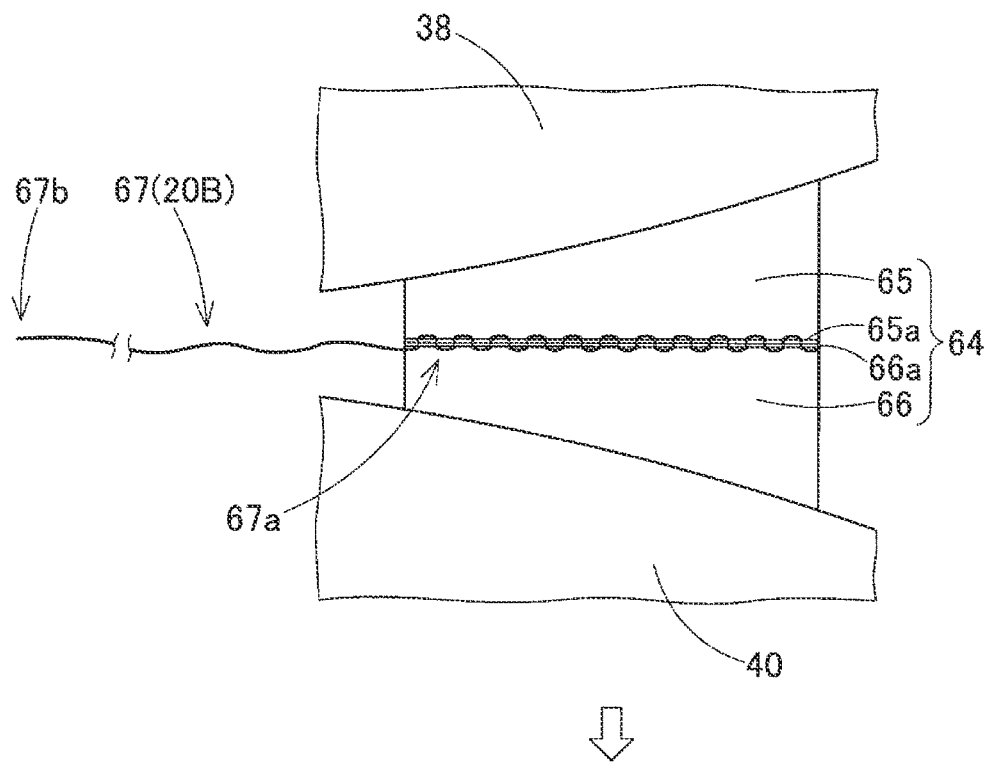
FIGS. 15A and 15B are enlarged views illustrating a coupling tether according to the third embodiment, and are diagrams illustrating states before and after an adjustment member is removed.
Figure 15B:
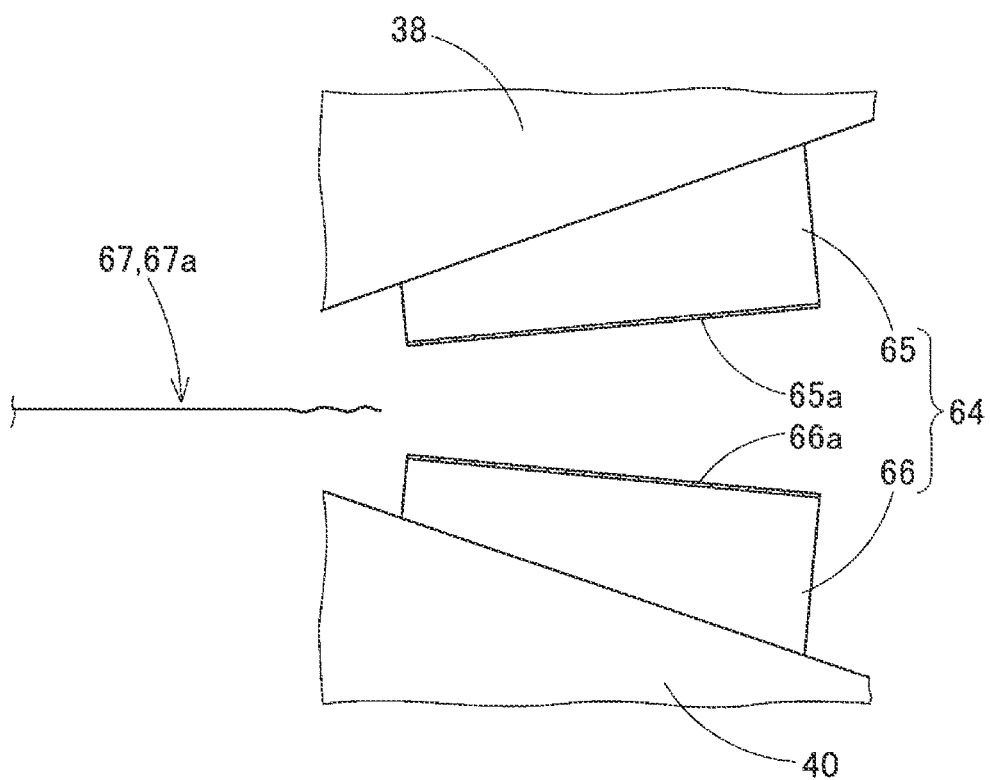

In the occupant protection device 10B according to the third embodiment illustrated in FIGS. 11 to 14, in the case where the protrusion length LL of the airbag 30B is large, the angle θ between the upper inflating portion 38 and the lower inflating portion 40 becomes narrow as illustrated in FIGS. 12 and 14, and an edge member 52B on a peripheral edge of the exhaust port 50B (the upper surface 42 of the lower inflating portion 40 of the peripheral edge of the exhaust port 50B as in the third embodiment) approaches the exhaust port 50B. Therefore, exhaust of the inflation gas G from the exhaust port 50B is interfered by the edge member 52B and thus is prevented (see FIG. 14). In contrary, in the case where the protrusion length LS of the airbag 30B is small when the airbag 30A is inflated, the angle θ between the upper inflating portion 38 and the lower inflating portion 40 becomes wide as illustrated in FIGS. 11 and 13, and the edge member 52B on the peripheral edge of the exhaust port 50B is separated from, rather than approaching, the exhaust port 50B. Therefore, exhaust of the inflation gas G from the exhaust port 50B is smoothly performed without being interfered by the edge member 52B.

Therefore, in the occupant protection device 10B according to the third embodiment as well, it is possible to easily adjust the internal pressure of the airbag 30B according to the magnitude of the protrusion length LL, LS of the airbag 30B when the airbag 30B is inflated.

The protrusion length adjustment unit 20B of the occupant protection device 10B of the third embodiment includes: a coupling tether 64 including an upper member 65 and a lower member 66 that are respectively coupled to the upper inflating portion 38 and the lower inflating portion 40 across the hollow portion 46, and that have tip ends 65a, 66a coupled to each other via a coupling member 67; and an actuator 21B that is disposed at the accommodation position 12 holding a base 67b of the coupling member 67, and operates to release holding of the coupling member 67 when the actuator 21B is in operation. As shown in FIGS. 13 to 15B, the coupling member 67 is coupled to the coupling tether 64 so as to sew the tip ends 65a, 66a of the upper member 65 and the lower member 66 to each other on a tip end 67a side, and can be pulled out from a coupling portion between the tip ends 65a, 66a so as to separate the tip ends 65a, 66a of the upper member 65 and the lower member 66 from each other. The base 67b side of the coupling member 67 is locked to the locking pin 21a of an actuator 21C configured with an electromagnetic solenoid by inserting the locking pin 21a into a locking hole 67c. When the actuator 21C is actuated, the locking pin 21a is pulled out from the locking hole 67c, and the base 67b side becomes a free end.

In the occupant protection device 10B including the protrusion length adjustment unit 20B, when the airbag 30B is to be inflated such that the protrusion length LL is increased with respect to the tall occupant OPE seated far from the accommodation position 12, the control device ECU receives the signal from the camera SO and actuates the actuator 21C to make the base 67b of the coupling member 67 a free end. Therefore, the tip end 67a of the coupling member 67 is not pulled out from the coupling tether 64, the coupling tether 64 regulates separation between the upper inflation portion 38 and the lower inflation portion 40, the angle θ between the upper inflation portion 38 and the lower inflation portion 40 is narrowed, and the airbag 30B is inflated such that the protrusion length LL is increased. In addition, even if the airbag 30B receives the occupant OPE by the restraint surface 44 of the rear surface 43d of the rear inflation portion 43, the upper inflation portion 38 and the lower inflation portion 40 are unlikely to separate from each other, and the exhaust amount from the exhaust port 50B is also reduced. Due to such synergy, efficient reaction force is ensured, and the airbag 30B can receive and protect the tall occupant OPE seated far from the accommodating position 12. In contrast, since the actuator 21B is not actuated by the control device ECU with respect to the short occupant OPS seated close to the accommodation position 12, the base 67b side of the coupling member 67 is locked to the locking pin 22, the tip end 67a of the coupling member 67 is removed from the coupling portion between the tip ends 65a, 66a of the upper member 65 and the lower member 66, the coupling tether 64 is separated into the upper member 65 and the lower member 66, and the upper inflation portion 38 and the lower inflation portion 40 are separated from each other. Accordingly, the airbag 30B is inflated such that the protrusion length LS is shortened. At this time, when the inflated airbag 30B receives the occupant OPS by the restraint surface 44 of the rear surface 43d of the rear inflation portion 43, the upper inflation portion 38 and the lower inflation portion 40 are separated from each other, exhaust from the exhaust port 50B is not prevented, and the inner pressure of the airbag 30B can be lowered. Therefore, increase of the reaction force is prevented, and the airbag 30B can receive and protect the short occupant OPS seated close to the accommodating position 12.

In the occupant protection device 10 according to the first embodiment, the protrusion length adjustment unit 20 includes: the strap 27 extending from the accommodation position 12; and the actuator 21 capable of adjusting the distance from the accommodation position 12 to the tip end 27a of the strap 27. The strap 27 couples the tip end 27a extending from the accommodation position 12 to the rear inflation portion 43 itself via the hollow portion 46. The actuator maintains a holding state on the base 27b side of the strap 27, so as to shorten the distance from the accommodation position 12 to the tip end 27a of the strap 27, when the actuator 21 is not in operation, and feeds out the base 27b side of the strap 27, so as to increase a substantial distance from the accommodation position 12 to the tip end 27a of the strap 27, when the actuator 21 is in operation.

In the first embodiment, the rear inflating portion 43 of the airbag 30 when the inflation is completed is coupled to the tip end 27a side of the strap 27 extending from the accommodating position 12. By actuating the actuator 21, that is, by pulling the locking pin 21a out from the locking hole 27c and the insertion hole 27d of the strap 27 so as to adjust the length from the accommodating position 12 to the tip end 27a of the strap 27 to be long, thereby increasing the length dimension SL of the tip end 27a of the strap 27 from the attachment hole 27e locked by the locking pin 21, or by not pulling the locking pin 21a out from the locking hole 27c so as to adjust the tip end 27a side of the strap 27 to have the short length dimension SS from the locking hole 27c locked by the locking pin 21a, the longitudinal position of the rear inflating portion 43 coupled to the tip end 27a side of the strap 27 is adjusted, and the protrusion length of the airbag 30 can be directly adjusted by adjusting the length of the strap.

The above operation is the same as the second embodiment in which the tip end 27a side of the strap 27A is directly coupled to the rear inflation portion 43 of the airbag 30A.

Figure 16:
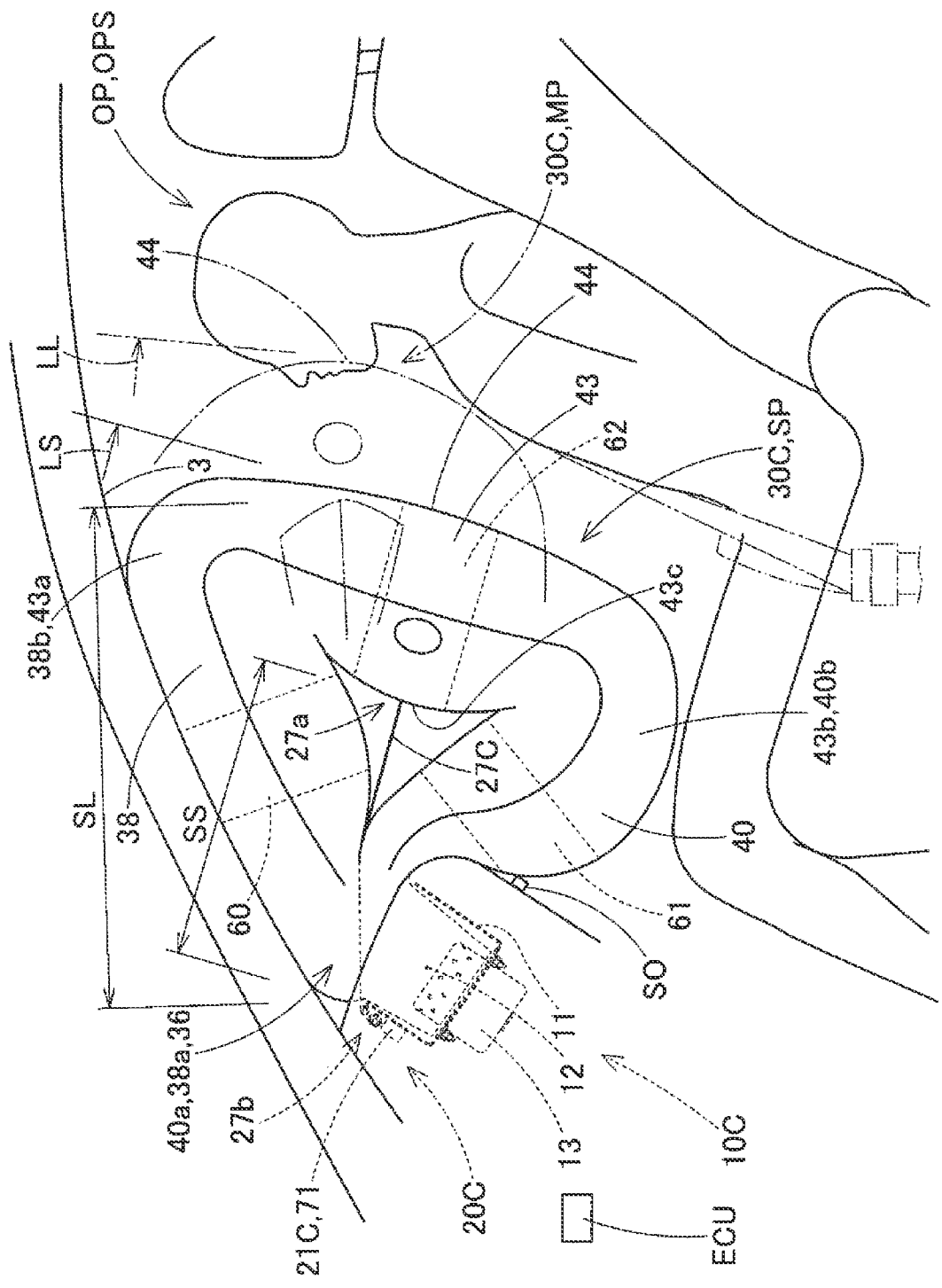
FIG. 16 is a diagram illustrating an operation state of an occupant protection device according to a fourth embodiment.
Figure 17:
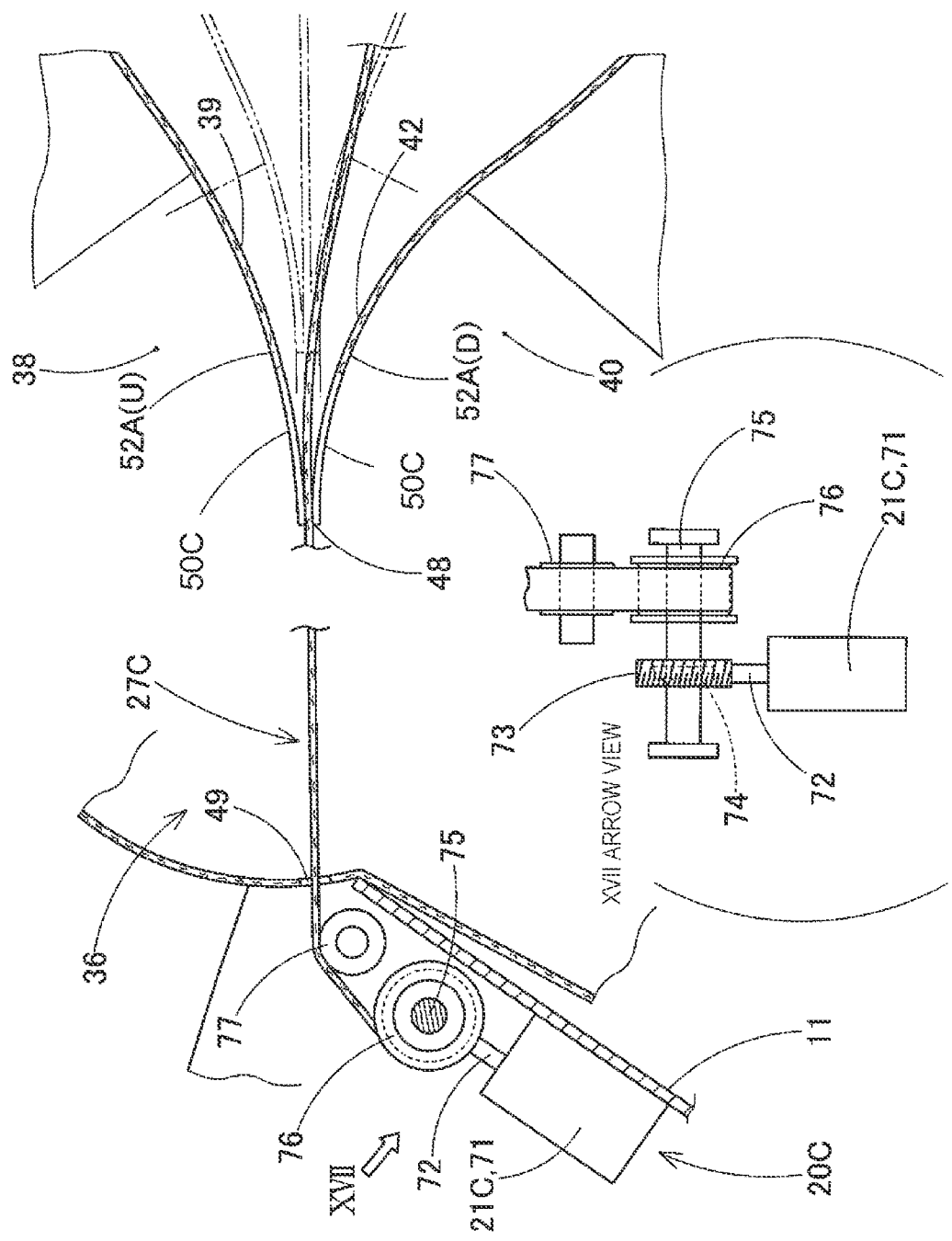
FIG. 17 is a schematic explanatory view illustrating a peripheral edge of an exhaust port and the vicinity of an actuator when an airbag according to the fourth embodiment is inflated.

Further, the configuration for adjusting the length of the strap may be configured as a protrusion length adjustment unit 20C of an occupant protection device 10C according to a fourth embodiment illustrated in FIGS. 16 and 17.

The protrusion length adjustment unit 20C includes: a step motor 71 serving as the actuator 21C whose operation is controlled by the control device ECU; a worm gear 73 provided on a drive shaft 72 of the motor 71; a pinion gear 74 meshing with the worm gear 73; a driven shaft 75 that fixes the pinion gear 74 and a winding roller 76 and is rotatably supported; and a support roller 77. In a strap 27C, the base 27b side is wound around the winding roller 76, and extends from the winding roller 76 via the support roller 77, and the tip end 27a side extending through the insertion holes 48 and 49 and the hollow portion 46 is coupled to the front surface 43c side of the rear inflation portion 43 of an airbag 30C (specifically, the front surface 43c side of the rear inner tether 62). The step motor 71 is incorporated with a sensor capable of detecting a rotation angle of the drive shaft 72. The rotation angle of the drive shaft 72 is controlled by a signal from the control device ECU, and the length dimension of the strap 27C fed out from the winding roller 76 toward the support roller 77 side is adjusted.

The control device ECU adjusts the rotation angle of the step motor 71 based on a signal of the seating position of the occupant OP from the camera SO serving as the occupant detection unit, so as to associate the length dimension of the strap 27C appropriately from the long length dimension LL to the short length dimension LS in three stages or finely corresponds to the distance of the seating position from the accommodation position 12, thereby adjusting the protrusion length of the airbag 30C by adjusting the length dimension of the strap 27C.

Similar to the exhaust port 50A according to the second embodiment, an exhaust port 50C is open across the lower surface 39 of the upper inflation portion 38 and the upper surface 42 of the lower inflation portion 40 on the inner peripheral surface 37 side in the vicinity of the intersection portion 36 between the upper inflation portion 38 and the lower inflation portion 40.

In this case, the angle θ between the upper inflation portion 38 and the lower inflation portion 40 when the airbag 30 is inflated is appropriately adjusted according to the fed-out length dimension of the strap 27C. Therefore, the exhaust port 50C can be in a half-open state between a fully closed state and a fully open state by the edge member 52A (U, D), and the exhaust amount of the inflation gas G from the exhaust port 50C can also be adjusted as appropriate.

Such a protrusion length adjustment unit 20C may be used for the occupant protection device 10, 10A of the first and second embodiments.

Further, in each embodiment, the actuator 21, 21B, 21C of the protrusion length adjustment unit 20, 20A, 20B, 20C, or the like is disposed on the front surface side of the case 11, but as long as the protrusion length of the airbag 30, 30A, 30B, 30C can be adjusted, the actuator 21, 21B, 21C or the like may be disposed on the rear surface side of the case 11 by associating the base 27b side of the strap 27, 27A, 27C with the insertion holes 48, 49.

What is claimed is:

1. An occupant protection device comprising:
   an airbag configured to be folded and accommodated forward of a seated occupant in a vehicle, and configured to be deployed and inflated rearward from an accommodation position so as to receive the occupant when an inflation gas flows in, the airbag including, as inflating portions: an upper inflating portion and a lower inflating portion configured to extend rearward in a manner branched upward and downward from the accommodating position, and a rear inflating portion coupling rear ends of the upper inflating portion and the lower inflating portion, the rear inflating portion having a rear surface side configured to serve as a restraint surface that receives the occupant, the airbag being provided with a hollow portion penetrating in a left-right direction in a center surrounded by the upper inflation portion, the lower inflation portion, and the rear inflation portion; and a protrusion length adjustment unit configured to adjust a protrusion length from the accommodation position to the restraint surface in the airbag, wherein:

an exhaust port configured to exhaust the inflation gas is disposed on an inner peripheral surface side in the vicinity of an intersection portion between the upper inflation portion and the lower inflation portion of the airbag; and in a case where the protrusion length by the protrusion length adjustment unit is adjusted to be long, the upper inflation portion and the lower inflation portion approach each other, so that an edge member approaches the exhaust port, thereby reducing an exhaust amount as compared to a case where the protrusion length is adjusted to be short.

2. The occupant protection device according to claim 1, wherein in the case where the protrusion length by the protrusion length adjustment unit is adjusted to be long, the edge member approaches the exhaust port, thereby closing the exhaust port.

3. The occupant protection device according to claim 1, wherein the exhaust port is open across the upper inflation portion and the lower inflation portion on the inner peripheral surface side of the intersection portion between the upper inflation portion and the lower inflation portion.

4. The occupant protection device according to claim 1, wherein the exhaust port is open on either side among the upper inflation portion and the lower inflation portion on the inner peripheral surface side of the intersection portion between the upper inflation portion and the lower inflation portion.

5. The occupant protection device according to claim 1, wherein:

the protrusion length adjustment unit includes:

a strap extending from the accommodation position; and an actuator configured to adjust a distance from the accommodation position to a tip end of the strap;

the strap connects the tip end extending from the accommodation position to the rear inflation portion via the hollow portion; and the actuator is configured to maintain a holding state on a base side of the strap, so as to shorten the distance from the accommodation position to the tip end of the strap, when the actuator is not in operation, and to feed out the base side of the strap, so as to increase a substantial distance from the accommodation position to the tip end of the strap, when the actuator is in operation.

6. The occupant protection device according to claim 5, wherein when the strap is adjusted in a manner such that the distance from the accommodation position to the tip end of the strap is increased so as to increase the protrusion length, the strap constitutes the edge member to close the exhaust port.

7. The occupant protection device according to claim 1, wherein:

the protrusion length adjustment unit includes:

a coupling tether including an upper member and a lower member that are respectively coupled to the upper inflating portion and the lower inflating portion across the hollow portion, and that have tip ends coupled to each other via a coupling member; and an actuator disposed at the accommodation position in a manner extending from the accommodation position and holding an end of the coupling member, and configured to operate to release holding of the coupling member when the actuator is in operation;

when the actuator is in operation, the actuator releases the holding of the coupling member to maintain a separation distance between the upper inflation portion and the lower inflation portion by the coupling tether, thereby inflating the airbag such that the protrusion length is adjusted to be long; and when the actuator is not in operation, the actuator holds the coupling member to remove the coupling member from a coupling portion between the upper member and the lower member in the coupling tether, so that coupling between the upper member and the lower member is released to increase the separation distance between the upper inflation portion and the lower inflation portion, thereby inflating the airbag such that the protrusion length is adjusted to be short.

8. The occupant protection device according to claim 1, wherein:

the accommodation position is an upper surface side of an instrument panel below a front windshield and forward of the seated occupant in the vehicle; and the airbag is arranged such that when the airbag is inflated, an upper surface side of the upper inflation portion can be in contact with the front windshield, and a lower surface side of a front side of the lower inflation portion can be in contact with a rear surface side bent downward from the upper surface side of the instrument panel.

* * * * *